United States Patent [19]
Lubenow et al.

[11] Patent Number: 5,715,398
[45] Date of Patent: Feb. 3, 1998

[54] SYSTEM FOR DISTRIBUTING ITEMS FROM AN ORIGIN TO A PLURALITY OF DESTINATIONS

[75] Inventors: Josef K. Lubenow, Chicago; Charles T. Albright, Richton Park, both of Ill.

[73] Assignee: R.R. Donnelley & Sons Company, Chicago, Ill.

[21] Appl. No.: 614,902

[22] Filed: Mar. 13, 1996

Related U.S. Application Data

[63] Continuation of Ser. No. 722,297, Jun. 27, 1991, abandoned, which is a continuation-in-part of Ser. No. 367,460, Jun. 16, 1989, abandoned.

[51] Int. Cl.$^6$ ................................................ G06F 17/60
[52] U.S. Cl. .............................................. 395/207; 395/230
[58] Field of Search ................................ 364/401, 402, 364/403, 406; 395/201, 207, 208, 210, 230

[56] References Cited

U.S. PATENT DOCUMENTS

| | | | |
|---|---|---|---|
| 3,474,240 | 10/1969 | Marquis et al. | 364/402 |
| 4,744,026 | 5/1988 | Vanderbei | 364/402 |
| 4,744,027 | 5/1988 | Bayer et al. | 364/402 |
| 4,744,028 | 5/1988 | Karmarkar | 364/402 |
| 4,788,643 | 11/1988 | Trippe et al. | 364/407 |
| 4,835,687 | 5/1989 | Martin | 364/402 |
| 4,858,147 | 8/1989 | Conwell | 364/148 |
| 4,862,357 | 8/1989 | Ahlstrom et al. | 364/407 |
| 5,021,953 | 6/1991 | Webber et al. | 364/407 |
| 5,063,506 | 11/1991 | Brockwell et al. | 364/402 |
| 5,068,797 | 11/1991 | Sansone et al. | 364/478 |
| 5,072,379 | 12/1991 | Eberhardt | 364/402 |
| 5,072,401 | 12/1991 | Sansone et al. | 364/478 |
| 5,270,921 | 12/1993 | Hornick | 364/407 |
| 5,331,546 | 7/1994 | Webber et al. | 364/407 |

FOREIGN PATENT DOCUMENTS 2000350   1/1979   United Kingdom.

OTHER PUBLICATIONS

"Overwhlemed with new rates?Here's one company's solution." *Handling & Shipping Mgmt.*, v24, Mar. 1983, pp. 1–7.
"Challenges in international distribution: . . . ," *Handling & Shipping Mgmt.*, v24, Jul. 1983, pp.1–8.
DIALOG Product Description –Shipline Management System (SMS) 4.6, released Jan. 1985, 2 pages.
Clement, "CPC –No Longer Freighted with Cost," *Today's Office*, v18, n2, Jul. 1983, pp. 49–50.
"NCPDM meets CLM in St. Louis." *Handling & Shipping Mgmt.*, v26, Dec. 1985, 12 pages.
DIALOG Product Description—ADVANTAGE The McKinney Consulting Transportation Mgmt. System, released Jul. 1987.
*Special Postal Bulletin*, Jan. 1991, Section 411.
Flood, *Operations Research*, vol. 4, No. 1, Feb. 1956.
Levin et al., *Quantitative Approaches to Management*, pp. 350–395 (4th Ed., 1978).

(List continued on next page.)

*Primary Examiner*—Gail O. Hayes
*Assistant Examiner*—Steven R. Yount
*Attorney, Agent, or Firm*—Marshall, O'Toole, Gerstein, Murray & Borun

[57] ABSTRACT

A system for developing a plan for distribution of items from an origin to a plurality of destinations uses an indication of an estimated number of books to be sent to the destinations to obtain a first total cost estimate representing the total cost of distributing the estimated number of items from the origin to the destinations using a first distribution system. The system obtains a second total cost estimate representing the total cost of distributing the estimated number of items from the origin to the destinations using a combination of the first and second distribution systems and compares the first cost estimate to the second cost estimate. If the first cost estimate is greater than the second cost estimate, a distribution plan is obtained from an indication of an actual number of items to be distributed whereby at least one of the items is to be sent to its destination using the first and second distribution systems.

12 Claims, 16 Drawing Sheets

OTHER PUBLICATIONS

Barr, et al., *The Handbook of Artificial Intelligence*, vol. 1, 1981, pp. 32–35.

*Domestic Mail Manual*, Dec. 1990, Section 426.

Denis Davis, Reining in Runaway LTL Costs, Chilton's Distribution, v8, p.36(3), Sep. 1985.

Wally Weart, It's in the Mail, Chilton's Distribution, v86, n10, p. 86(2), Oct. 1987.

Wallt Weart, High Parcel Rates?Skip it!, Chilton's Distribution, v85, p. 84(2), Aug. 1986.

Wally Weart, Customize Your Computer Rate System, Chilton's Distribution, v88, n5, p. 58(2), May 1989.

SYSTEM FOR DISTRIBUTING ITEMS FROM AN ORIGIN TO A PLURALITY OF DESTINATIONS

CROSS REFERENCE TO RELATED APPLICATION

The present application comprises a Continuation of U.S. application Ser. No. 07/722,297, filed Jun. 27, 1991, now abandoned, which is in turn continuation-in-part of Lubenow, et al., U.S. patent application Ser. No. 07/367,460, filed Jun. 16, 1989, now abandoned, assigned to the assignee of the instant application, the disclosure of which is incorporated by reference herein.

TECHNICAL FIELD

The present invention relates generally to distribution methods, and more particularly to a method of distributing items using one or both of first and second distribution systems.

BACKGROUND ART

Often, it is necessary to distribute large quantities of items such as commodities including, but not limited to, printed products, from a single origin to a plurality of destinations. For example, a printer who produces a large quantity of books at a printing location typically mails the books to the destinations at a Postal Service facility associated with the printing plant location. If the books comprise magazines, they are mailed via second class while the books are mailed third or fourth class if they constitute catalogs or other bound and printed matter. The postage rates for the aforementioned mail classes consist of varying combinations of per-piece and per-pound rates. The per-pound rates are partially or entirely variable with respect to the distance between the point of entry into the system and the final destination. In general, the per-piece rates do not vary with distance. However, there are instances when the per-piece rates are reduced based on entry into the system at local or regional facilities near the final destination.

If the books are sent by second class, the portion of the weight of the books attributable to editorial content is subject to a flat (or non-zoned) per-pound rate whereas the remaining portion is subject to a zoned per-pound rate. The zoned rate is determined in accordance with various factors including the weight of each book, the percentage of each book constituting advertising, the profit/nonprofit status of the publisher and the distance between the point at which the books are entered into the Postal Service and the destination of each book. The last factor is defined by the use of a zone table which provides a zone number between the origin and each destination. An "intra-SCF discount" is awarded for a book when the entry point into the Postal System is within the same sectional center facility service area of the destination. This discount is partially applied against the zoned per-pound rate and, as of 1991, partially applied against the per-piece rate.

Books sent by fourth class are subject to a similar zoned rate structure as second class books, except that each entire book is subject to the zoned per-pound rates, and the intra-SCF discount is replaced by a somewhat similar "local zone" discount.

Prior to 1991, the rate structure for third class mail was such that postage was based on weight for weights above a certain limit and less than one pound. For weights below the certain limit, such item was subject to a flat rate. At that time, postage for third class mail was not based on distance. However, in 1991, the Postal Service modified the third class rate structure. Under the current structure, items entered into the Postal System at the local office containing the destination of such items receive a highest discount while items entered into the Postal System at the SCF serving the destination receive a second, lower discount while items delivered to the bulk mail center (BMC) serving the destination receive a third, still lower discount. Significantly, no discounts are based upon the distance the items are shipped in order to enter such items into the Postal System at one of these three locations. The rate structures thus established for second and fourth class mail (and that established by United Parcel Service) reward a shipper for entering items into the Postal System in an amount dependent upon the proximity of the entry point to the final destination, and hence, in a sense, take into account the distance the items are shipped prior to entry. The rate structure now established for third class mail, however, only rewards entry of items at the local office, SCF or BMC serving the destination without regard to the distance the items must be transported to enter them at such points.

Below a certain "breakpoint" between three and four ounces, which varies if the mail qualifies for regular or non-profit rates, third class rates are expressed in a per-piece rather than a per-pound format.

The foregoing rate structures established by the U.S. Postal Service allow a printer or other entity to determine in advance the total cost of delivering items from an origin to a series of destinations using the Postal Service alone. However, it has been found that, under some circumstances, a savings in total distribution costs can be realized by using a combination of common, contract or private carrier (hereinafter "hired carrier") and the U.S. Postal Service or another similar zoned distribution carrier to deliver the items. Applicant has devised a prior art computer program, shown in detail in FIGS. 6A–6F of the above-identified Lubenow, et al., U.S. application Ser. No. 07/367,460, which can be used to develop a distribution plan which reduces total distribution costs. The program utilizes a heuristic approach to deriving a distribution plan which does nit aim at a minimum or optimal distribution cost. Rather, the program aims at an optimal combination of efficiency in obtaining a solution and the value of the solution obtained. One could conceivably minimize distribution costs by deriving a distribution plan using linear programming techniques; however, such an approach would require complex programming and would involve substantial amounts of computer time to obtain an optimal result. In fact, the total computer time required may offset the savings in distribution costs.

Patents which disclose linear programming techniques for allocating resources include Vanderbei, U.S. Pat. No. 4,744,026 and Bayer, et al., U.S. Pat. No. 4,744,027. A book entitled Quantitative Approaches To Management, by Richard I. Levin and Charles A. Kirkpatrick, 4th Edition, McGraw-Hill, Inc., 1978, discloses at pages 350–395 linear programming methods for allocating products produced by several plants to several job sites.

While applicants' system has proven successful in reducing total distribution costs, the program requires circulation data allocated by zip code area provided by the publisher in order to derive the distribution plan. Often, however, this information is unavailable, as for example when the printer wishes to approach a potential customer for the purpose of hiring the printer to print and ship books to subscribers. In such a case, it would be desirable to at least provide an indication of potential savings which could be realized by using a combination of hired carrier and the U.S. Postal Service to distribute books.

Further, applicants' prior art computer program shown in detail in FIGS. 6A–6F of the above-identified Lubenow, et al. patent application operates without regard to potential savings that might be realized utilizing the new third class rate structure established by the U.S. Postal Service. Still further, it would be desirable to have the ability to develop a distribution plan that would provide for entry of items into the Postal System at stopoff locations along a specified route. Also, it would be desirable to account not only for the number of items to be distributed, but also the weights of such items.

SUMMARY OF THE INVENTION

In accordance with the present invention, a system for developing a plan for distribution of items from an origin to one or more destinations permits one to ascertain estimated savings resulting from the use of a hired carrier and the U.S. Postal Service to distribute items.

More specifically, a system for developing a plan for distribution of items from an origin to a series of destinations using at least one of first and second distribution systems includes data entry means for permitting a user to enter data and a memory for storing entry points each comprising a possible location for entry of items into the first distribution system including an entry point for the origin and at least one other entry point for a location remote from the origin. A processing unit is provided having first cost estimate deriving means for deriving a first total cost estimate representing the total estimated cost of distributing the estimated number of items from the entry point for the origin to the destinations using the first distribution system. The processing unit further includes means for developing data for each selected entry point other than the entry point for the origin representing an estimated cost to send items from the origin to an entry point using the second distribution system. Second cost estimate deriving means derives a second total cost estimate representing the total estimated cost of distributing the items from the origin to the destinations via one or more entry points using a combination of the first and second distribution systems. If the second cost estimate is less than the first cost estimate, an indication of an actual number of items to be distributed is used by plan deriving means to derive a distribution plan whereby at least one of the items is to be sent to its destination via an entry point other than the entry point for the origin using the first and second distribution systems. The items may be distributed in accordance with the distribution plan if the second cost estimate is less than the first cost estimate.

The present invention utilizes publicly available and proprietary data supplied by various sources in order to obtain an estimate of potential cost savings. Thus, a printer or other distributor of items can provide an indication of savings without the need for actual circulation totals.

DESCRIPTION OF THE PREFERRED EMBODIMENT

Figure 1:
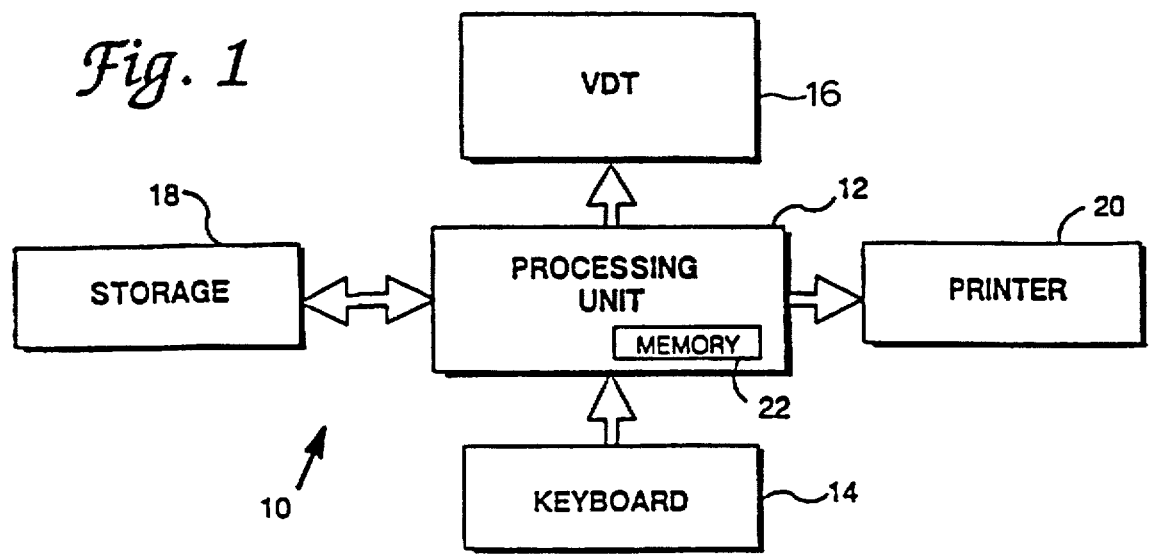
FIG. 1 is a block diagram of a processing unit and peripheral components which may be programmed to implement the present invention.

Referring now to FIG. 1, there is illustrated a personal computer system 10 which may be used to implement the present invention. The system 10 includes a processing unit 12 which accepts input from a keyboard 14 and which provides display data to a video display terminal (VDT) 16. The processing unit 12 receives and stores data via a storage unit 18, such as a conventional floppy and/or hard disk drive. The processing unit 12 also provides output data to a printer 20.

The processing unit 12 includes an internal memory 22 which stores various intermediate and final data as well as programming to implement a portion of the method of the present invention. The processing unit 12 may include an 8-bit 8088 chip, a 16-bit 80286 chip or a different processor chip, as desired.

Figure 2:
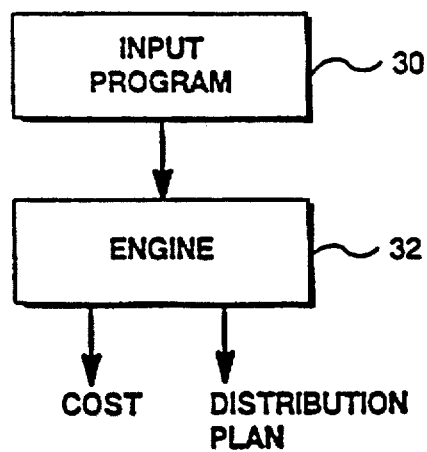
FIG. 2 is a generalized flowchart of programming executed by the processor of FIG. 1 to implement the present invention.

Referring now to FIG. 2, the processing unit 12 executes an input program, block 30, which accepts parameters specified by a user and which in turn develops distribution data which is provided to an "engine", block 32. The engine develops data representing the cost to distribute items from an origin to a series of destinations together with a distribution plan specifying how the items are to be distributed. In the preferred embodiment, the programming illustrated in generalized form in FIG. 2 uses estimated circulation data to derive an indication of estimated savings which could be realized by distributing books using a combination of private shipper and the Postal Service as compared with distributing the books by the Postal Service alone. As noted in greater detail hereinafter, if significant savings can be realized, data representing the actual number of books to be sent to destinations are used by the engine 32 a second time to obtain an actual distribution plan and the cost of distributing the books according to such plan.

Figure 3A:
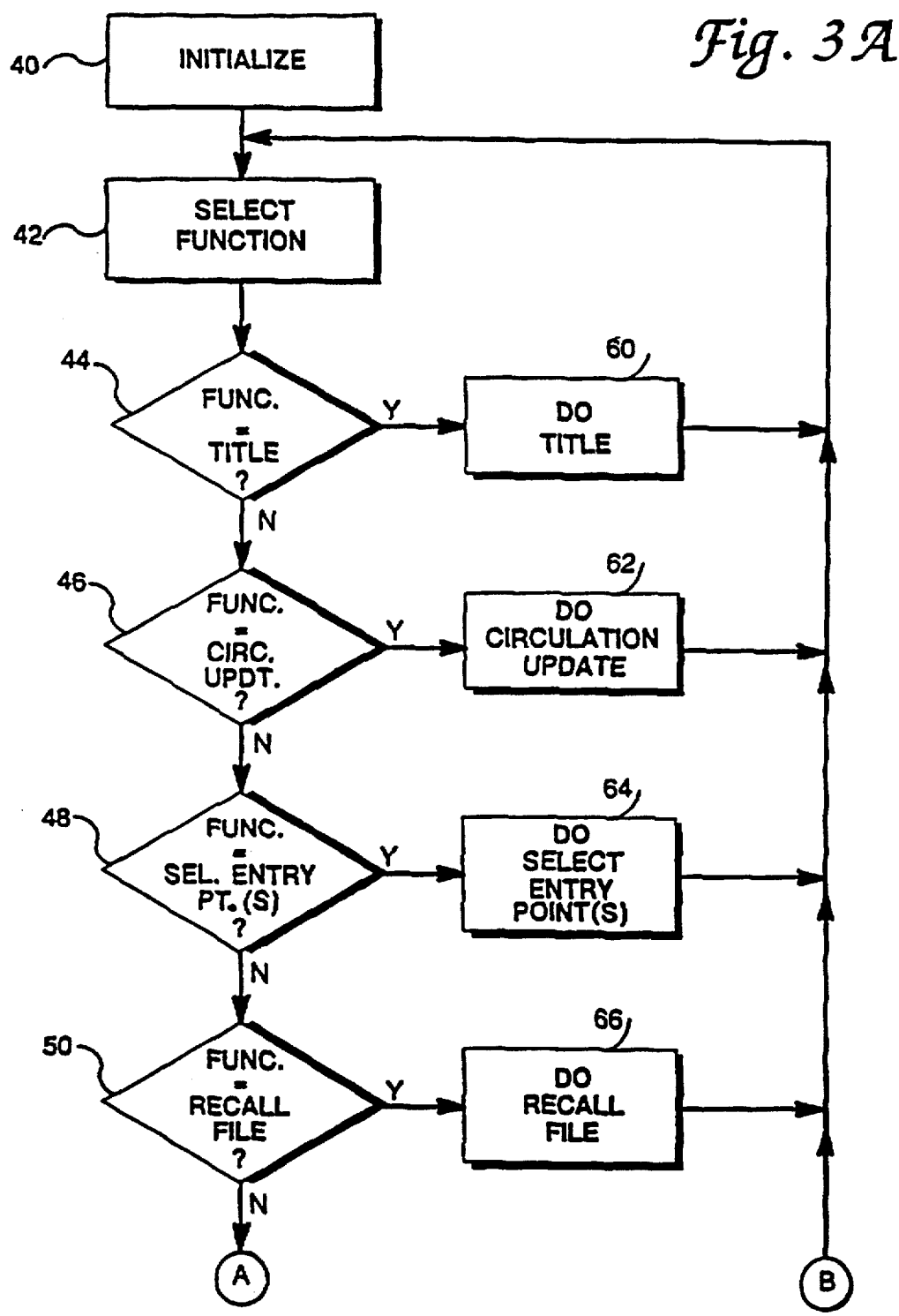
FIGS. 3A and 3B, when joined at the similarly lettered lines, together comprise a flowchart of programming executed by the input program block of FIG. 2.
Figure 3B:
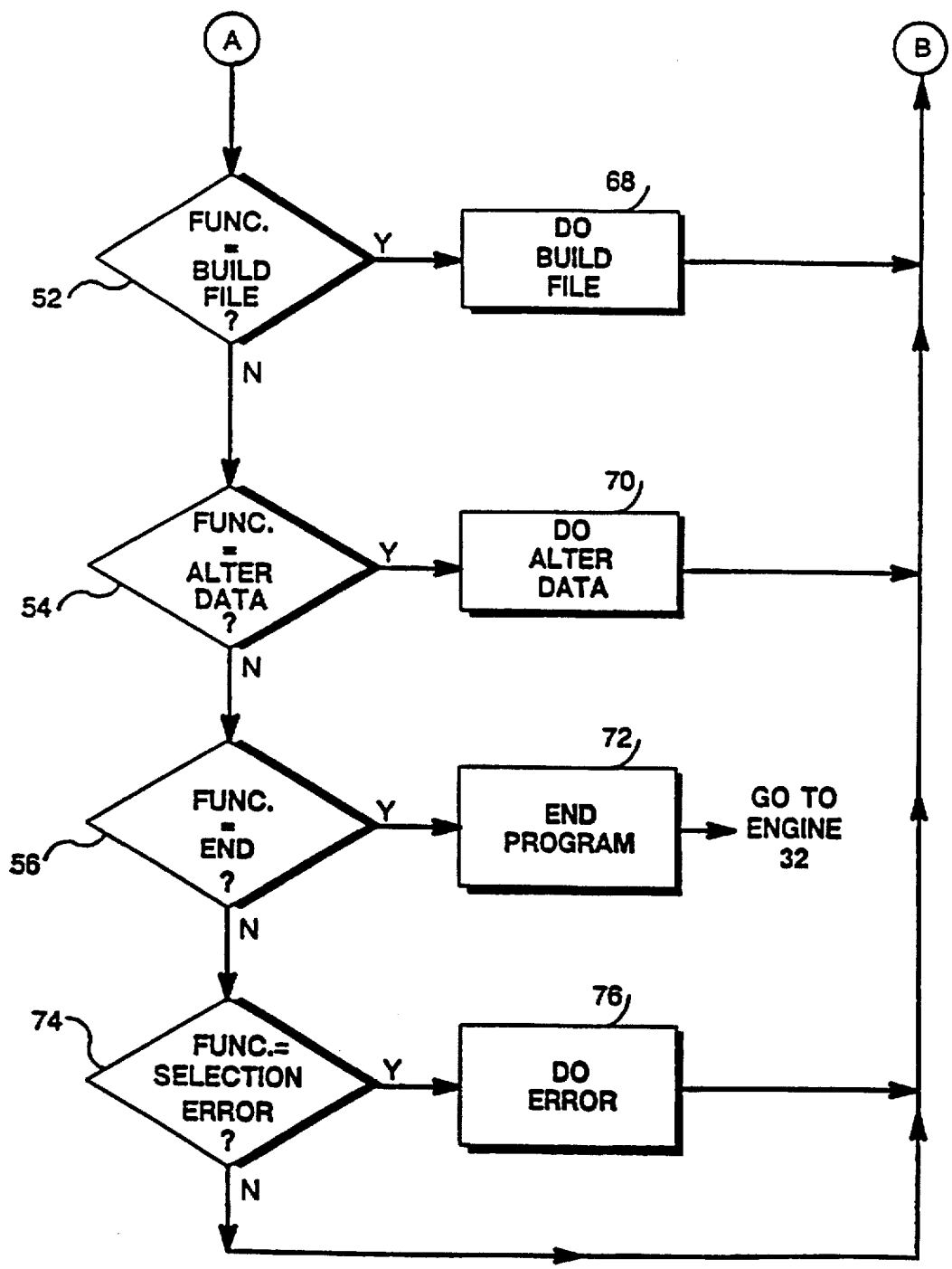

Referring now to FIGS. 3A and 3B, the input program 30 implements a series of functions, any of which may be selected by an operator using a menu-type system. Following a block 40 at which various parameters are initialized by the program, a block 42 causes a menu to be displayed on the VDT 16 prompting an operator to select one of several functions. A series of blocks 44–56 then pass control from the block 42 to one of seven blocks 60–72 which perform the desired function. These functions are described in detail below.

Title Function

The title function permits an operator to access circulation data using a key term entered by the operator via the keyboard 14. The data are provided by the Audit Bureau of Circulations and are available free of charge to members of such organization. The data comprise a series of circulation totals by state or territory for each of a number of publications. These circulation totals are actual circulation counts of previous distributions of items and are considered to be a basis for estimating future circulation totals. These totals are not provided by the publisher to the operator directly. The circulation data are provided on diskette and may be entered into the processing unit 12 via the storage unit 18.

Instead of entry of the circulation data to the processing unit 12 by diskette via the storage unit 18, the operator may enter such data via the keyboard 14 from printed audit reports, if desired.

The title function implemented by the block 60 may also include programming allowing a user to move through the circulation file alphabetically by publisher or publication name.

Circulation Update Function

The circulation update function implemented by the block 62 allows the operator to increase or decrease all state and territory circulation totals by a constant factor or allows the operator to selectively update only certain circulation totals to reflect recent changes. Alternatively, changes to circulation totals may be specified to allow the operator to determine what effect such changes may have on any resulting distribution plan.

Select Entry Point(s) Function

The block 64 allows the operator to select via the keyboard 14 one or more postal facilities for entry of publication pieces into the U.S. Postal System. Each of these Postal System facilities is identified as an "entry point" and is designated by the identification of the "zip code area" for the Postal System facility. As used herein, the term "zip code area" is intended to mean any geographically contiguous group of areas designated by zip codes having the same 3-digit or 5-digit zip code portions. In the preferred embodiment, up to a maximum of sixty-four entry points may be specified by the operator.

Recall File Function

The block 66 allows an operator to recall data stored by the storage unit 18 or data stored in the memory 22 and developed during a prior run of the program.

Build File Function

The block 68 uses the estimate of circulation totals by state and territory and develops data representing a simulated number of books to be delivered to each zip code area within each state and territory using delivery point data supplied by the U.S. Postal Service. The delivery point data specify the number of delivery points reported to exist within each zip code area. The build file function multiplies the state or territory circulation total by a factor representing the percentage of total state or territory delivery points in the zip code area to derive a simulated total of items to be delivered to destinations within the zip code area.

The block 68 also generates simulated freight rates using proprietary mileage data available from Rand McNally & Co. indicating the mileage between pairs of 3-digit zip code areas. In addition to the proprietary mileage data, a cost-per-mile factor that varies according to one or more linear functions specified by the operator may be used to derive the simulated freight rates.

The operator may also specify the minimum total weight or marginal dollar value required to justify use of an entry point. More specifically, the operator can specify weight or dollar value minimums which must be exceeded in order to justify use of an entry point. As noted in greater detail hereinafter, the operator can also specify a rounding factor defining truck surpluses and truck deficits. The user also specifies the minimum and maximum truck weights which are considered acceptable.

In addition to the foregoing, extraneous factors may constrain the search for desirable entry points to a subset of those that are specified. This may be due to, for example, restrictions imposed by the U.S. Postal Service or the like. The operator may enter instructions to the program to take into account such constraints in this portion of the program.

Alter Data Function

The alter data function implemented by the block 70 allows the operator to override or customize any of the current postal rates or the private freight rates subsequently used by the engine 32, to directly specify any zip code area circulation count or to stipulate that items to be delivered to any given zip code area must be distributed via a specified entry point regardless of economic considerations.

End Function

The end function implemented by the block 72 terminates processing by the program 30 and allows control to pass to the engine 32 when desired.

Following the block 56, if it is determined that there has been an error in selecting a function, the block 74 passes control to a block 76 which in turn implements an error routine which informs the operator via the VDT 16 of the error.

Control from each of the blocks 60–72 or 76 returns to the block 42, FIG. 3A.

Figure 4:
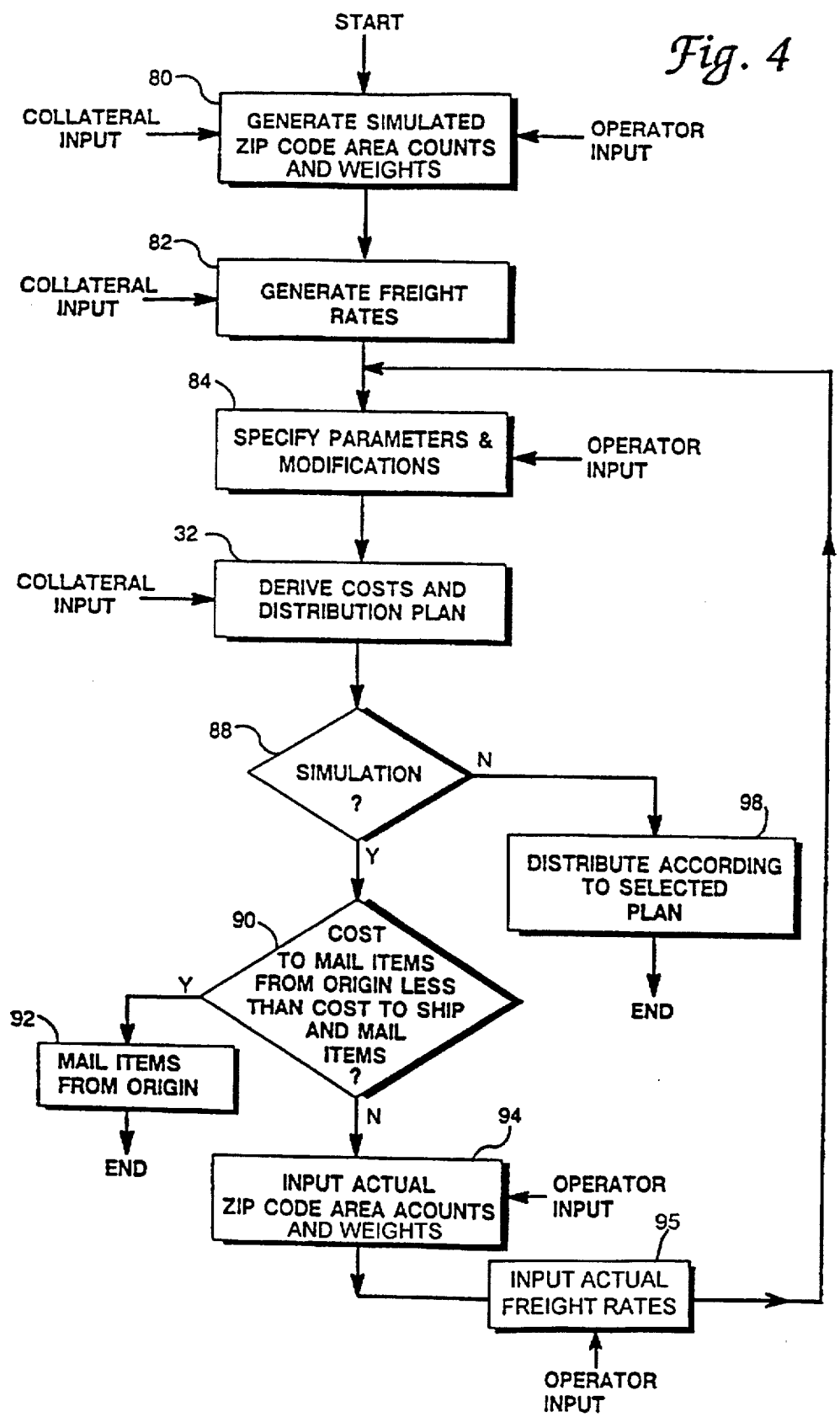
FIG. 4 is a flowchart of the present invention which utilizes the input program and engine of FIG. 2.

FIG. 4 illustrates the steps of the method of the present invention. A series of blocks 80–84 are undertaken using the programming illustrated in FIGS. 3A and 3B and comprise a part of the input program represented by the block 30, FIG. 2. Beginning at a block 80, the operator selects the build file function represented by the block 68, FIG. 3B, to generate simulated zip code area counts using the circulation data provided by the Audit Bureau of Circulations. If the simulation is to account for piece weights, the operator may enter such piece weights at the block 80. The weights are entered for each zip code area so as to simulate distribution of multiple pieces all of the same or differing weights and produced under the same or multiple press runs or jobs. The blocks 82 and 84 generate the simulated freight rates and allow the operator to specify the parameters and modifications noted above in connection with the build file program.

Control then passes to the engine 32 which derives a distribution plan which simulates how books are to be sent to the various destinations and the simulated cost of sending such items.

Following the block 32, if the distribution plan derived by the engine 32 is a simulated plan, a determination is made by the operator, block 90, whether the cost to mail the items from the origin is less than the cost to ship and mail the items using the distribution plan. If so, no savings can be realized by using a combination of hired carrier and the U.S. Postal Service and hence it is economically more attractive to mail items from the origin, block 92. On the other hand, the simulated distribution plan results in an estimated savings, a block 94 allows the operator to input the actual zip code area counts for the subject publication and a block 95 allows the operator to input actual freight rates. In the event that actual weights are to be considered in developing an actual distribution plan, the actual weights to be delivered to each zip code area may be entered at the block 94. In this case, for each zip code area, an indication of a total weight is obtained. In some but not all cases, the items to be distributed are all of the same weight, and hence total weight is directly proportional to count. However, there may be instances where the items to be distributed are not identical in the sense that the items may be similar but not have the same weight. This could occur, for example, where different signatures are assembled to produce books under a single publication title. Still further, there may be instances where different publications are separately produced but shipped together to destinations. In these cases, the total weight is not simply a function of counts, and hence the weights must be separately summed.

Following the blocks 94 and 95, control then returns to the block 84 to derive an actual distribution plan and an actual distribution cost. Once this function has been accomplished by the block 32, the books are distributed according to the actual distribution plan, block 98.

Figure 5:
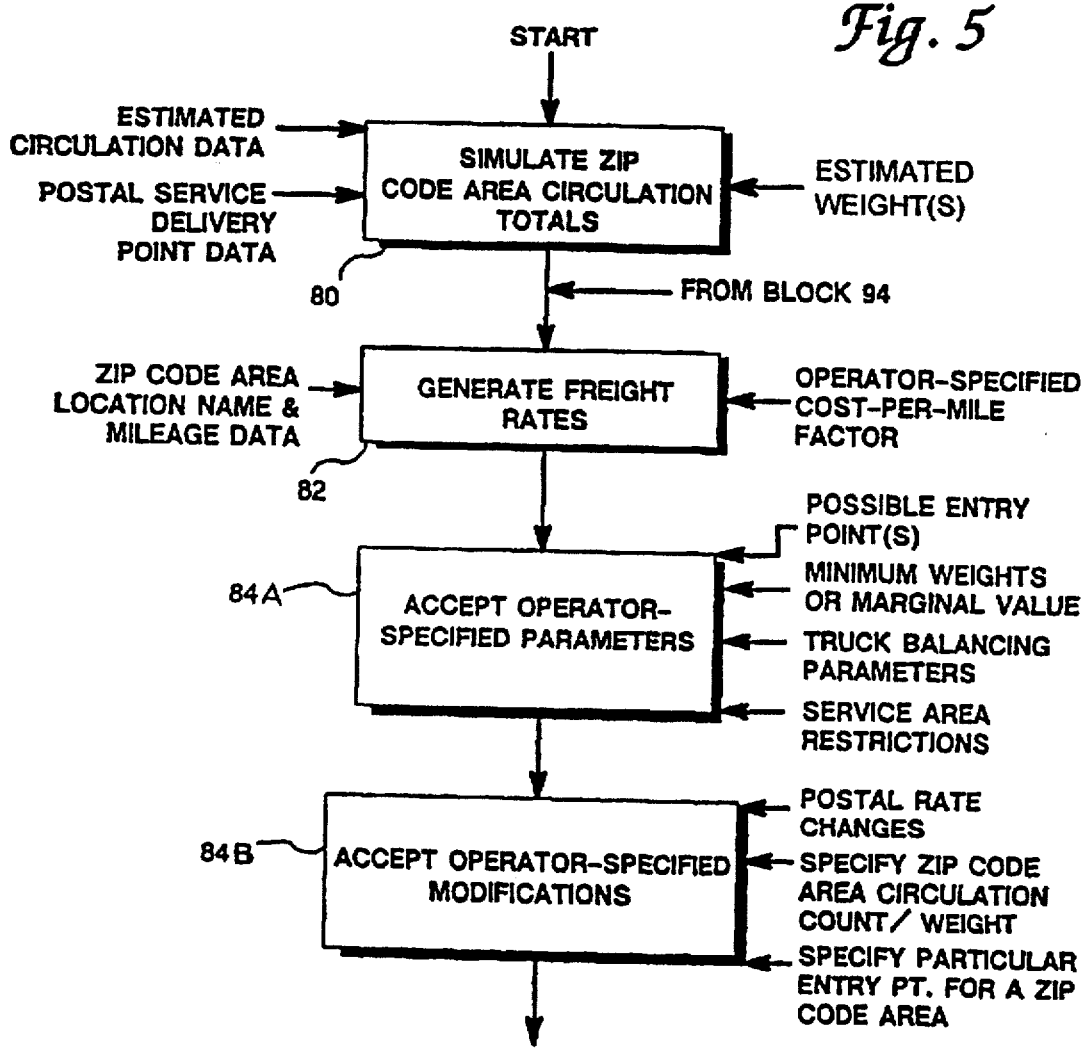
FIG. 5 comprises a more specific flow chart of the programming executed by the blocks 80, 82 and 84 of FIG. 4.

FIG. 5 illustrates in greater detail the data utilized by the blocks 80–84. The block 80 utilizes the data representing the estimated circulation for the publication as well as the U.S. Postal Service delivery point data. In addition, the block 80 utilizes the estimated weights for the publication and for each zip code area. The block 82 utilizes the Rand McNally proprietary data specifying location names of the zip code areas and the mileage between areas as well as the operator-specified cost-per-mile factor. It should be noted that the latter factor may be a first linear function for distances up to a certain limit and a different linear function thereafter, if desired.

The block 84 has been split up in FIG. 5 into blocks 84A and 84B. The block 84A permits the operator to specify the possible entry points, the minimum weights or marginal values required to justify an entry point, the truck balancing parameters and the service area restrictions. The block 84B allows the operator to modify the postal rates used in the computations and to specify zip code area circulation counts and/or weights and to identify a particular entry point for items to be delivered to a particular zip code area.

Referring now to FIGS. 6A–6F, there is illustrated in greater detail the programming of the engine 32. The program begins at a block 110 which initializes various variables used in the program. The block 110 may, in addition, assemble a lookup table in the memory 22 of the processing unit 12 establishing pseudo-zoned rates for third class. The lookup table stores four discounts for each zip code. The first or highest discount is obtained from the lookup table when the lookup table is addressed by signals indicating that items for the zip code area are to be entered at the home office thereof. A second, lower discount is obtained from the lookup table when it is addressed by signals indicating that items for the zip code area are to be entered at the SCF thereof, while the third, lowest discount is obtained from the lookup table when it is addressed by signals indicating that items for the zip code area are to be entered at the BMC thereof. If items for the particular zip code area are not entered at any of the home office, SCF or BMC thereof, the lookup table develops an indication of a zero discount for such items. The operator may enter an indication of the particular class of mail the items fall under at the block 110 or at another point in the programming. As noted in greater detail hereinafter, other operator-specified values and data are also entered at the block 110. Following the block 110, a block 112 then calculates the postage required to mail all of the items from the entry point associated with the origin. The lookup table established by the block 110 is utilized in this calculation, if the items are to be mailed as third class items. This cost figure is thus derived under the assumption that none of the items is to be shipped by hired carrier to an entry point other than the entry point associated with the origin. This cost represents the maximum cost which would be incurred to distribute the items.

A block 114 then sets an index variable denoted ENTRY__INDEX to zero and a block 116 increments the value of ENTRY__INDEX. A block 118 determines whether all of the entry points have been considered in a loop consisting of the blocks 116 and 118 and a pair of blocks 120 and 122 and, if not all of the entry points have been considered, the block 120 checks to determine whether the entry point is "feasible". As used herein, an entry point is "feasible" if the freight rate per book, mile or unit of weight is less than the greatest possible postal savings which could be realized by trucking items to the entry point under consideration and entering the items into the U.S. Postal System at such entry point. Again, in the event of third class mail, the lookup table established by the block 110 is utilized to calculate the postal savings which could be realized. If the block 120 determines that the entry is not feasible, a block 122 sets a flag to indicate that the entry is infeasible and control returns to the block 116. If the block 120 determines that the entry is feasible, control bypasses the block 122 and returns directly to the block 116.

Once the loop comprising the blocks 116–122 has been executed for all of the entries under consideration, control passes to a series of blocks 124–168 which are repetitively executed to derive successive allocations of items to entry points until specified targets and solution criteria are met. The blocks 124–168 determine for each zip code group the entry point(s) at which the items to be delivered to such zip code group should enter the U.S. Postal System.

More particularly, the block 124 sets each of three variables, MARGINAL__VALUE, RELATIVE__VALUE and ZIP__CODE__AREA__INDEX equal to zero. A block 126, FIG. 6B, then increments the variable ZIP__CODE__AREA__INDEX and a block 128 checks to determine whether all zip code areas to which items are to be sent have been considered. If this is found not to be the case, a block 130 sets a variable ENTRY__INDEX equal to zero and sets a pair of variables LOWEST__COST and SECOND__LOWEST__COST equal to arbitrarily high values.

Following the block 130, a block 132 increments the variable ENTRY__INDEX and a block 134 checks to determine whether the entry point currently under consideration is still eligible and feasible. As noted previously, the eligibility of the entry point is determined by the block 122 or by the block 168, FIG. 6D, described in greater detail hereinafter. If this is found to be the case, a block 136 checks to determine whether all entry points have been considered for the zip code area currently under consideration. If not all entry points have been considered, a variable COST__TO__ENTRY is calculated. This variable is equal to the cost to mail zoned items from the entry point to the respective zip code area, plus the non-zoned cost of the items, the freight cost, i.e., the cost to ship the items by hired carrier from the origin to the entry, and a penalty cost. The penalty cost is defined as the increase in cost to distribute the items from the origin to the destination due to the loss of intra-SCF discount in second class or local zone discount in fourth class that may be caused by shipping of the items from the origin to the appropriate entry point rather than mailing the items from the entry point serving the destination. In the case of third class mail, there is no penalty cost, and the cost to mail zoned items from the entry point to the respective zip code area is obtained by determining the pseudo-zone in which the entry point currently under consideration is located. If the entry happens to be the local office, SCF or BMC for the zip code area currently under consideration, then the discounts obtained from the lookup table established by the block 110 are utilized to calculate the postage. If the entry is not the local office, SCF or BMC of the zip code area currently under consideration, then the postage is calculated at a zero discount. All of the factors summed by the block 138 are expressed in like units, preferably on a per-pound basis. By taking into account the weight of the mail pieces, any variable postage factors that are expressed in a per-piece rate format are converted to a per-pound basis.

Figure 6A:
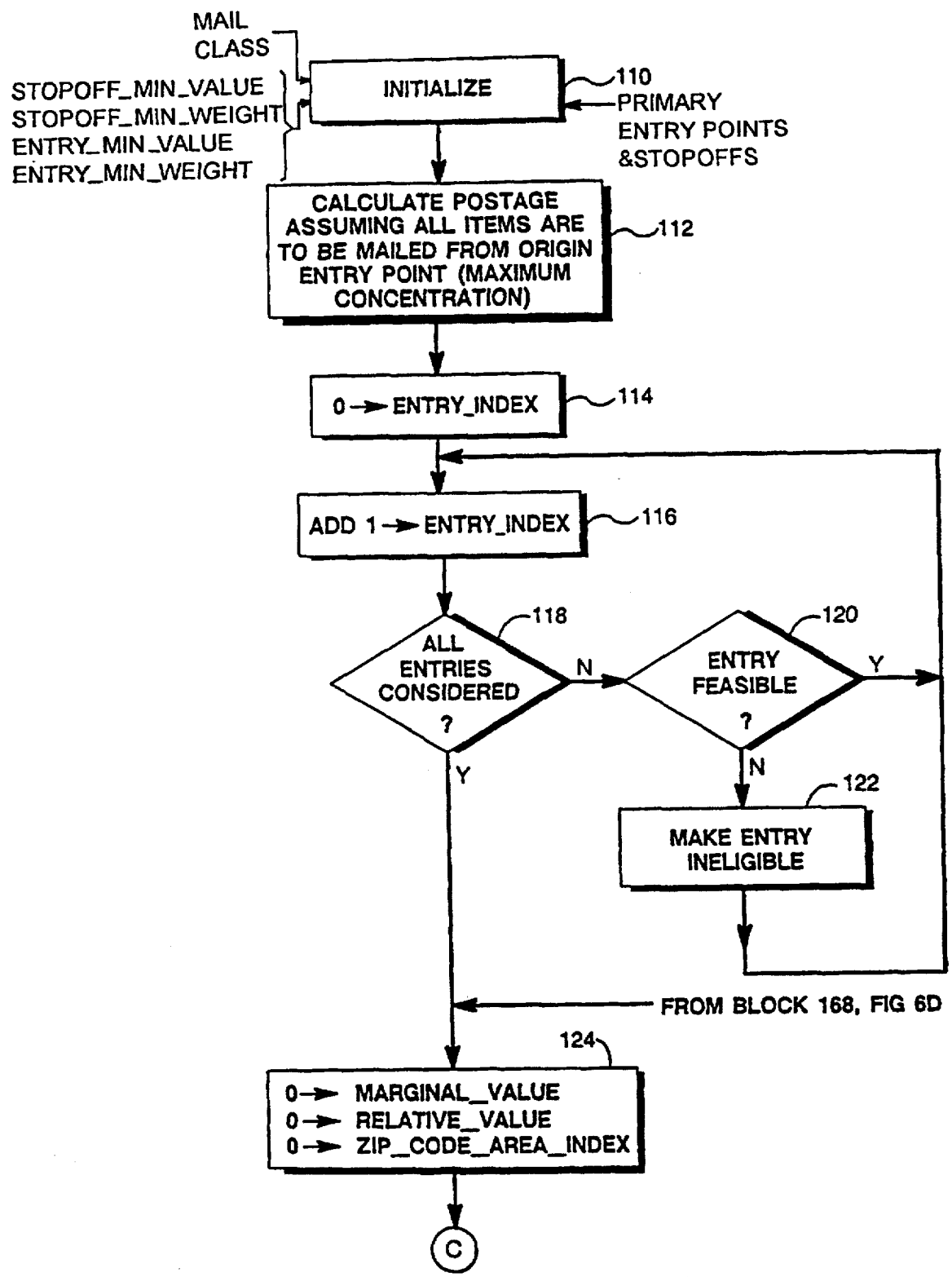
FIGS. 6A–6F, when joined along the similarly lettered lines, together comprise a more specific flowchart of the programming executed by the block 32 of FIG. 4.
Figure 6B:
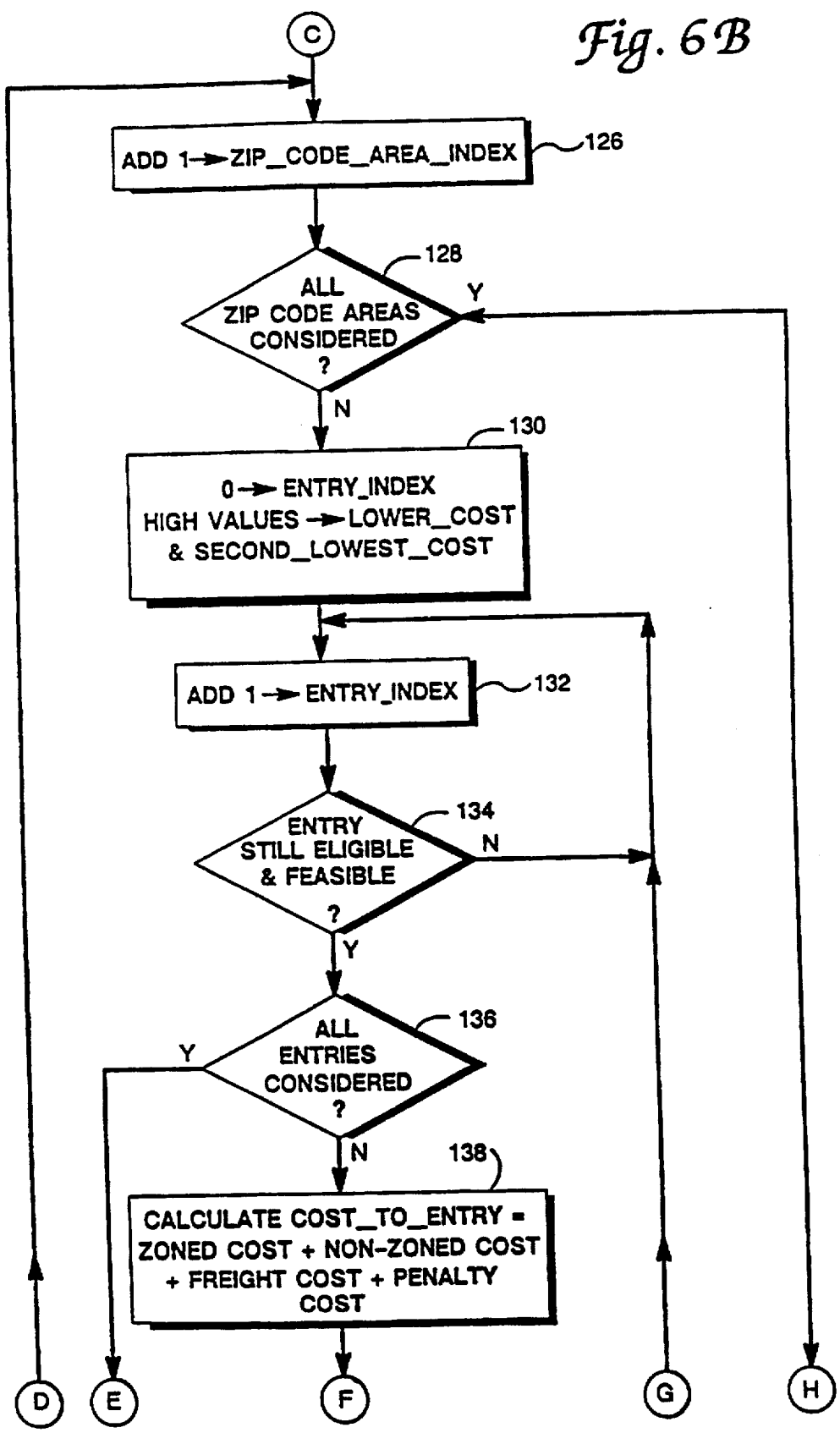
Figure 6C:
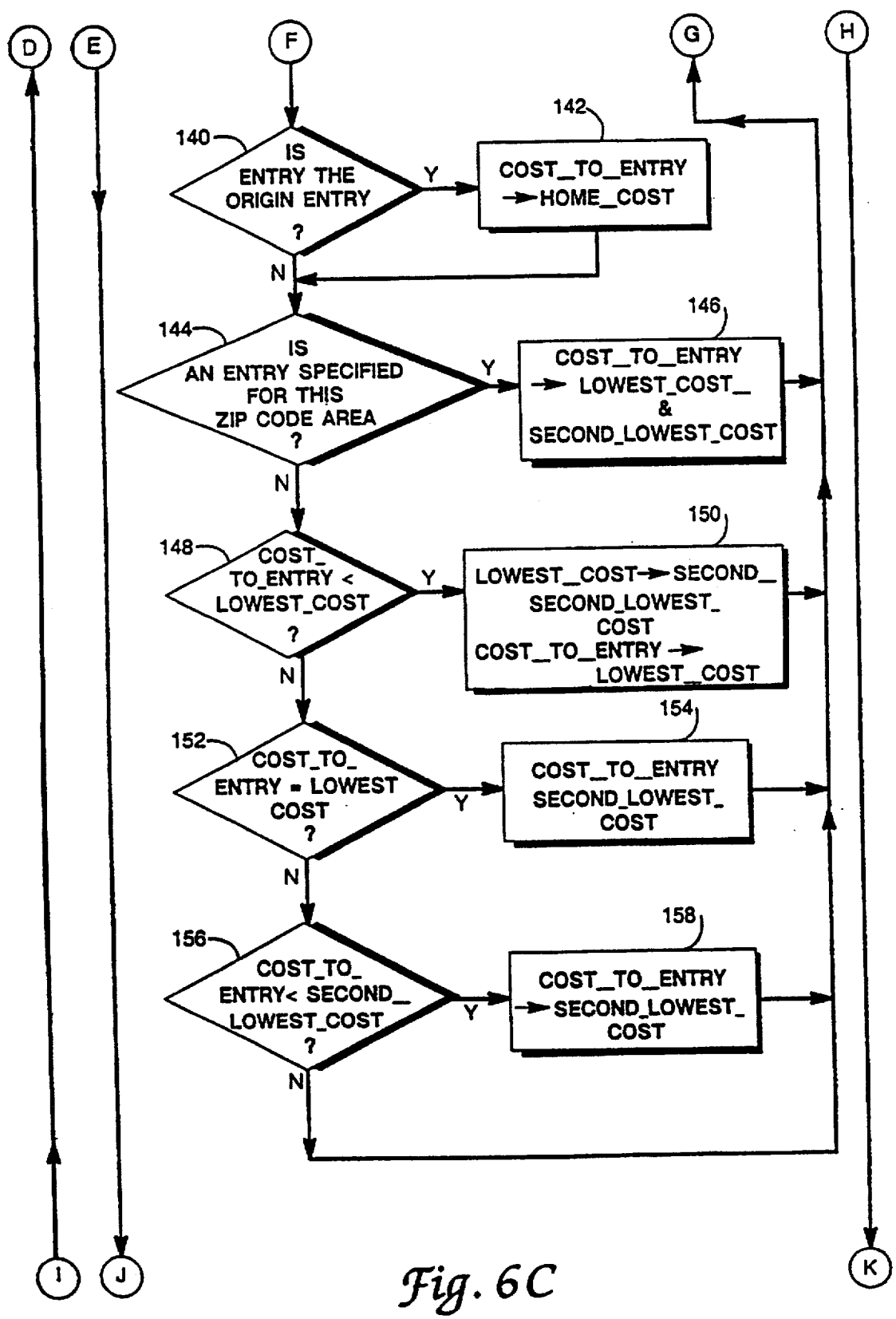

Following the block 138, a block 140, FIG. 6C, checks to determine whether the entry point currently under consideration is the entry point associated with the origin. If this is found to be the case, a variable HOME_COST is set equal to the current value of the variable COST_TO_ENTRY. Following the block 142, or the block 140 if the current entry point is not the origin entry point, a block 144 checks to determine whether an entry point has been specified by the operator for the particular zip code area under consideration. If so, a block 146 sets the variables LOWEST_COST and SECOND_LOWEST_COST equal to the value of the variable COST_TO_ENTRY.

If an entry point has not been specified for the zip code area currently under consideration, a block 148 checks to determine whether the variable COST_TO_ENTRY is less than the variable LOWEST_COST. If so, the current value of the variable LOWEST_COST is assigned to the variable SECOND_LOWEST_COST and the value of the variable COST_TO_ENTRY is assigned as the new value of LOWEST_COST. If the block 148 determines that the current value of the variable COST_TO_ENTRY is not less than the value of the variable LOWEST_COST, then a block 152 determines whether the current values of these variables are equal. If so, a block 154 assigns the value of the variable COST_TO_ENTRY to the variable SECOND_LOWEST_COST. If not, a block 156 determines whether the value of the variable COST_TO_ENTRY is less than the value of the variable SECOND_LOWEST_COST. If so, a block 158 sets the value of the variable SECOND_LOWEST_COST equal to the value of the variable COST_TO_ENTRY.

If the block 156 determines that the value of the variable COST_TO_ENTRY is not less than the value of the variable SECOND_LOWEST_COST, control returns to the block 132 where the variable ENTRY_INDEX is incremented. Control also returns to the block 132 from each of the blocks 146, 150, 154 and 158.

Figure 6D:
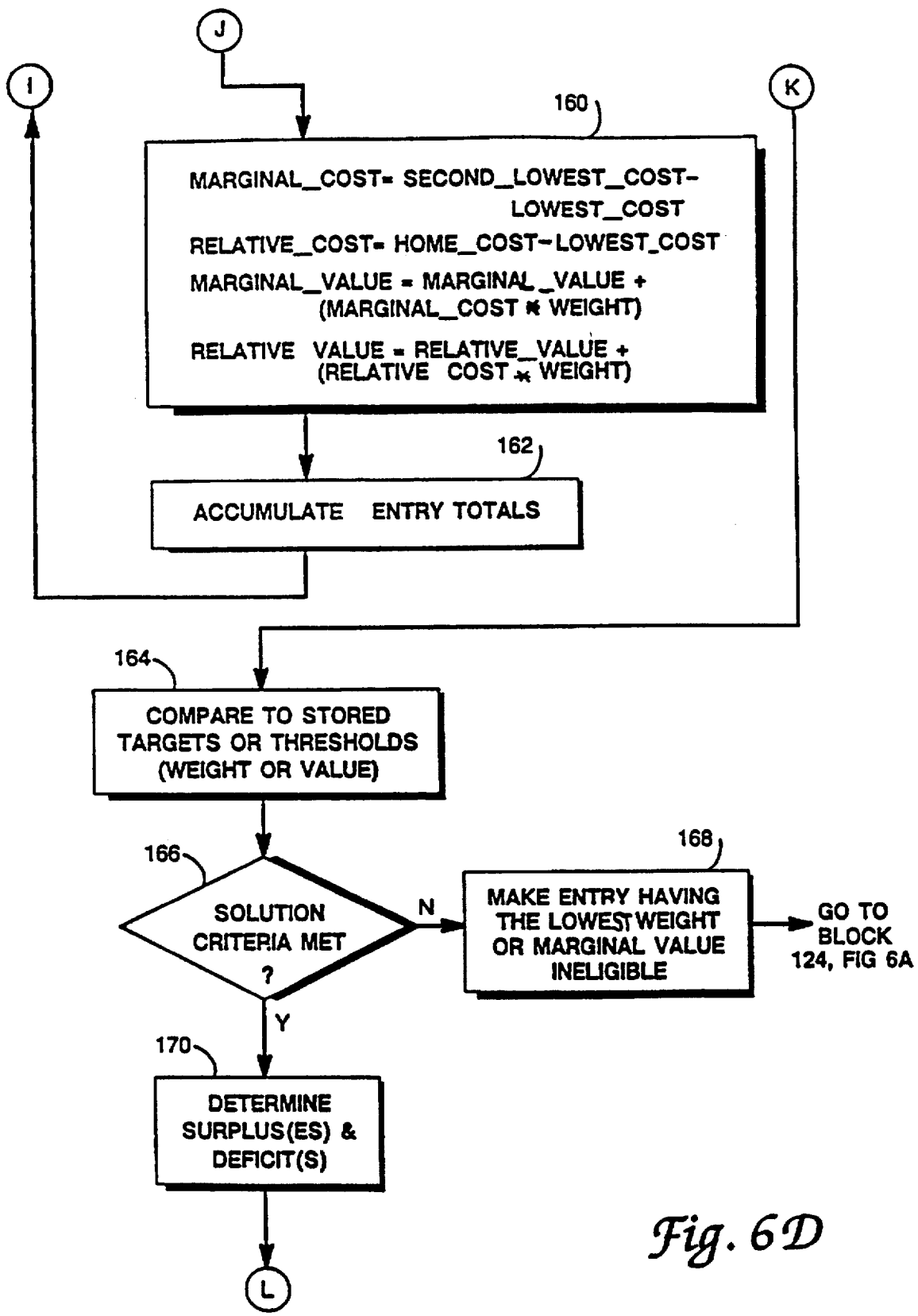
Figure 6E:
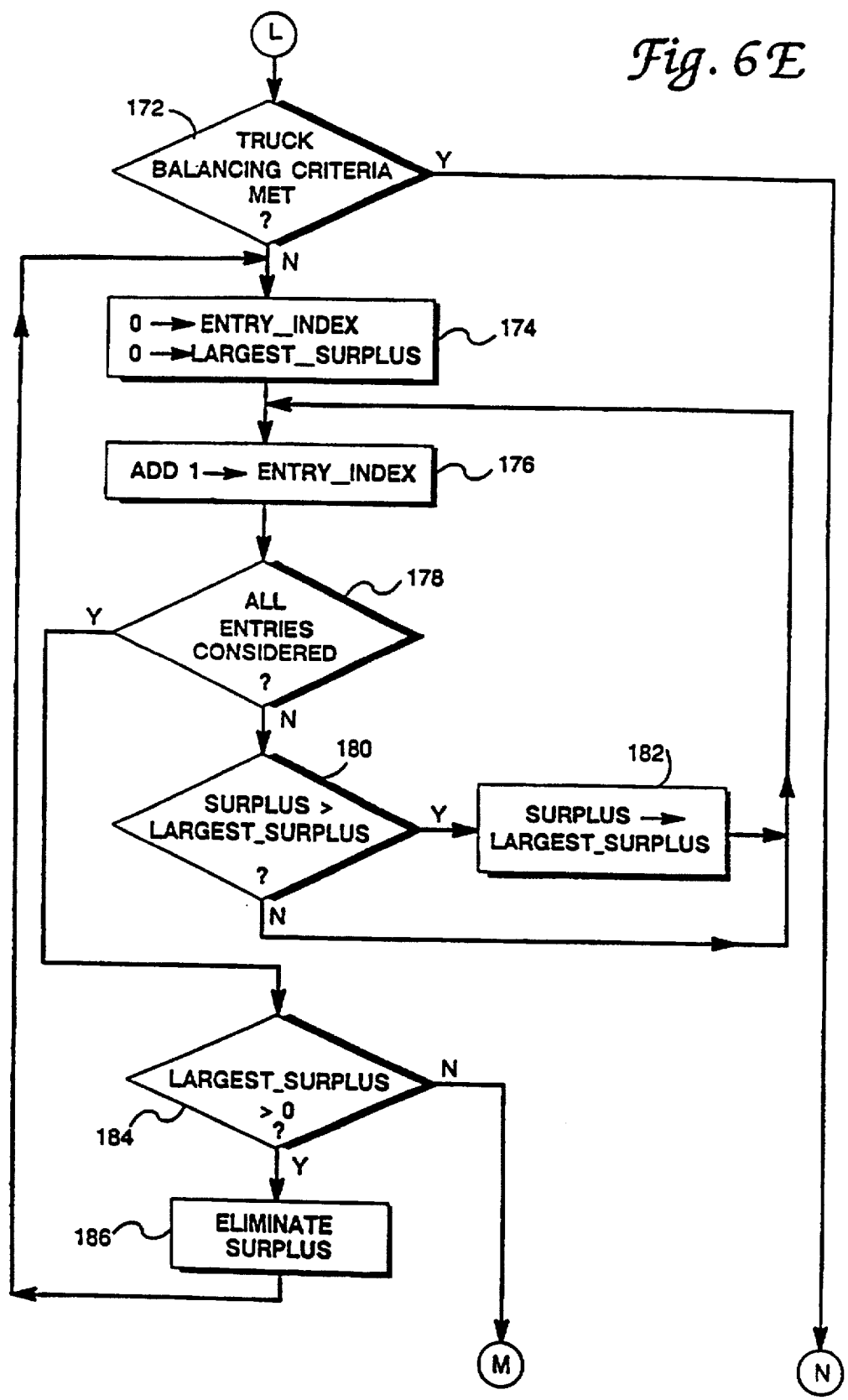
Figure 6F:
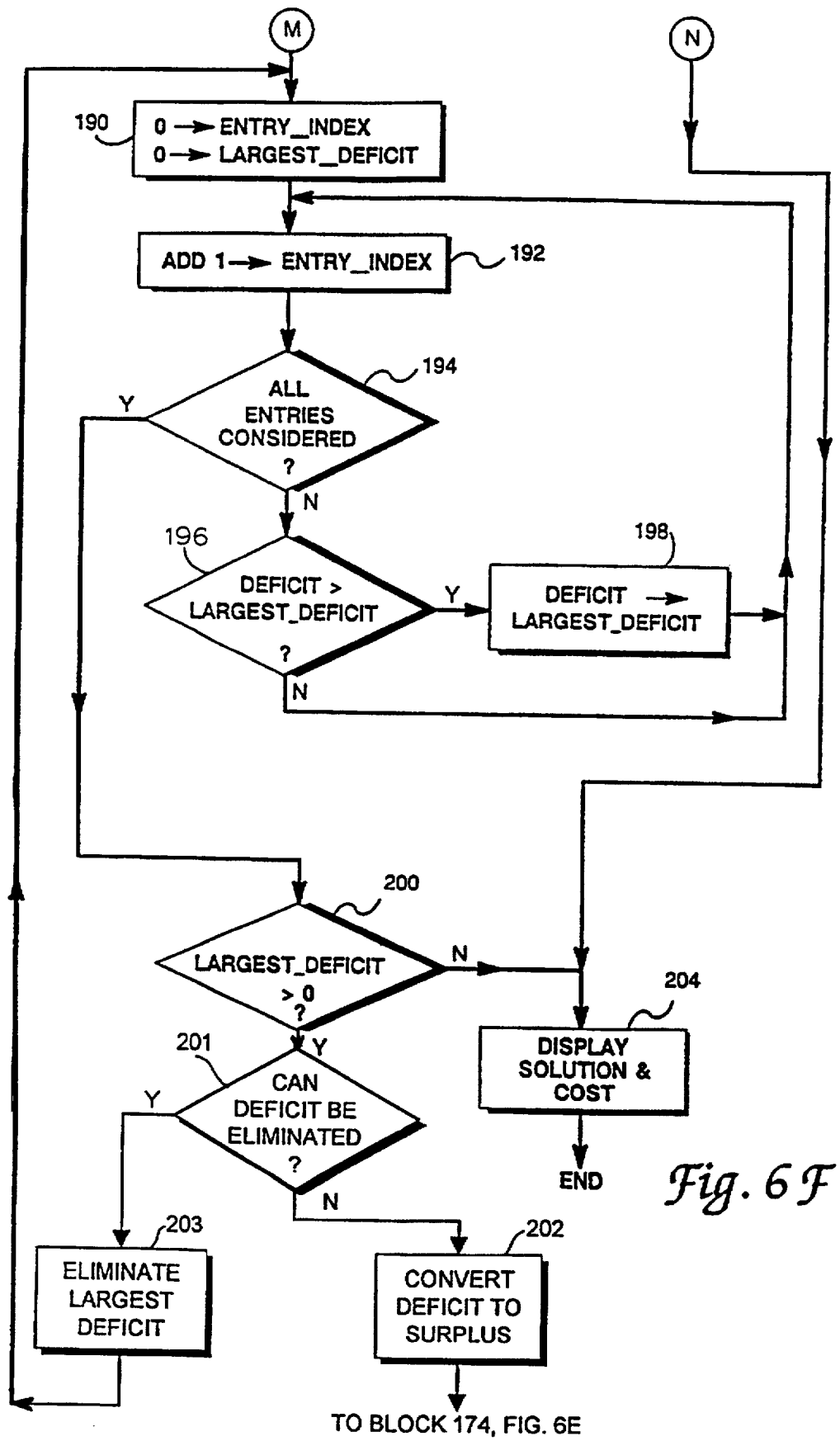

Once the block 136, FIG. 6B, determines that all of the entry points for the zip code area currently under consideration have been considered, control passes to a block 160, FIG. 6D, which calculates the values of four variables, MARGINAL_COST, RELATIVE_COST, MARGINAL_VALUE and RELATIVE_VALUE. The value of the variable MARGINAL_COST is equal to the value of SECOND_LOWEST_COST minus the value of LOWEST_COST while the value of the variable RELATIVE_COST is equal to the value of HOME_COST minus the value of LOWEST_COST. A new value for the variable MARGINAL_VALUE is calculated as being the old value of MARGINAL_VALUE plus the value of the variable MARGINAL_COST times the weight of the number of items to enter the U.S. Postal Service at the entry point under consideration. The value of the variable RELATIVE_VALUE is specified as being the old value of such variable plus the value of the variable RELATIVE_COST multiplied by the weight to the entry point. Following the block 160, a block 162 determines which is the lowest cost entry point for the zip code area currently under consideration and updates registers holding an accumulated total of the number of pieces and the total weight of all items which are tentatively assigned to the entry point. In addition, registers holding the number of items to be distributed to each zone (in the case of second and fourth class mail) or pseudo-zone (in the case of third class mail) surrounding the entry point are updated.

Following the block 162, control returns to the block 126 where the ZIP_CODE_AREA_INDEX variable is incremented.

Control remains in the loop consisting of the blocks 126-162 until a determination has been made by the block 128 that all of the zip code areas which are to receive items have been considered. Control then passes to a block 164 which compares the data indicating the number of pieces and weight tentatively assigned to each entry point against preselected targets or thresholds expressed as functions of weight or marginal value. If a block 166 determines that specified solution criteria have not been met by the tentative assignment of items to the entry points, a block 168 sets a flag to make the entry point having the lowest weight or marginal value ineligible for subsequent passes of the program. As noted in greater detail hereinafter, the entry point may be considered a "primary entry" or a "stopoff". Control then returns to the block 124, FIG. 6A, which begins the process of reallocating items to the remaining entry points.

The blocks 124-164 are successively re-executed to reallocate items from entry points having relatively low weights or values to other entry points. Eventually, the number of entry points becomes reduced to a point whereby the specified solution criteria have been met or exceeded. Thereupon, control passes to a block 170 which determines all surplus (es) and deficit(s). Surpluses and deficits are defined in terms of truckloads where operator-specified parameters identify minimum and maximum weights for each truckload. For example, an operator may specify that each truckload is to have a minimum of 30,000 pounds and a maximum of 40,000 pounds of items. Under such an assumption, weights to an entry point less than 30,000 pounds are less than a full truckload and thus the cost to ship each item in such a truck increases beyond an acceptable value. Weights between 60,000 and 80,000 pounds to an entry point are considered acceptable inasmuch as such weights can be allocated between two trucks, each having between 30,000 and 40,000 pounds of items. Weights between 40,000 and 60,000 pounds are considered undesirable inasmuch as the excessive weight above one truckload between 30,000 and 40,000 pounds is less than a full truckload, and hence shipping costs per item rise beyond an acceptable level.

Weights to an entry point above 90,000 pounds can be accommodated by a number of trucks, all of which are loaded with weights between 30,000 and 40,000 pounds. Weights between 80,000 and 90,000 pounds, however, require two trucks loaded between 30,000 and 40,000 pounds and a truck loaded with a weight less than 30,000 pounds. Again, weight in this range is considered undesirable.

In order to reduce costs by reducing partial truck-loads, the block 170 determines whether the weights to each point fall within the undesirable gaps which, as noted in the example given above, are between zero and 30,000 pounds, 40,000 and 60,000 pounds and 80,000 and 90,000 pounds. If a weight for an entry point falls in one of these gaps, a determination is made by the block 170 whether there is a surplus or a deficit. This determination is made in accordance with an operator-specified rounding factor which is a fractional value between zero and 1. The rounding factor is applied against the particular gap and weights below the weight defined by the rounding factor are treated as surpluses whereas weights above the weight specified by the rounding factor up to the next acceptable weight are considered deficits. Thus, for example, if the rounding factor is assumed to be 0.8, a weight below 24,000 pounds or between 40,000 and 56,000 pounds or between 80,000 and 88,000 pounds is considered a surplus. Conversely, weights between 24,000 and 30,000 pounds or between 56,000 and 60,000 pounds or between 88,000 and 90,000 pounds are considered to be deficits. These surpluses and deficits are reduced or eliminated by reallocating weights between entry points. This procedure is continued at a block 172, FIG. 6E, which checks to determine whether operator-specified truck balancing criteria have been met. Such criteria are met in the foregoing example when all trucks to all entry points are loaded with weights between 30,000 or 40,000 pounds. If the truck balancing criteria have not been met, a block 174 sets the variable ENTRY_INDEX and a variable LARGEST_SURPLUS equal to zero. A block 176 then increments the value of ENTRY_INDEX and a block 178 checks to determine whether all entry points have been considered. If not, a block 180 determines whether the surplus for the entry point currently under consideration is greater than the value of the variable LARGEST_SURPLUS. If not, control returns to the block 176 where the variable ENTRY_INDEX is again incremented. On the other hand, if the surplus for the entry point is greater than the value of the variable LARGEST_SURPLUS, a block 182 assigns the magnitude of the surplus as the value of the variable LARGEST_SURPLUS. Control from the block 182 then returns to the block 176.

Once all of the surpluses for the entry points have been considered, control passes from the block 178 to a block 184 where a determination is made whether the value of the variable LARGEST_SURPLUS is greater than zero. If so, then a surplus has been detected in one or more entry points and the largest surplus is eliminated by reallocating the surplus to other entry points. Control then returns to the blocks 174–182 to determine whether a surplus still exists. Control remains with these blocks until all surpluses have been eliminated. Thereafter, control passes to a block 190, FIG. 6F.

The block 190 sets the value of the variable ENTRY_INDEX and a variable LARGEST_DEFICIT to zero. A block 192 increments the variable ENTRY_INDEX and control passes to a block 194 which checks to determine whether all entry points have been considered. If not, a block 196 checks to determine whether any deficit for the entry point currently under consideration is greater than the current value of the variable LARGEST_DEFICIT. If so, the magnitude of the current deficit is assigned to the variable LARGEST_DEFICIT and control returns to the block 192.

If the block 196 determines that the current deficit is not greater than the value of the variable LARGEST_DEFICIT, control returns directly to the block 192.

Once all entries have been considered for deficits, control passes from the block 194 to a block 200 which checks to determine whether the value of the variable LARGEST_DEFICIT is greater than zero. If so, a block 201 checks to determine whether the deficit can be eliminated. This is determined by ascertaining whether there are other entry points without deficits from which items can be transferred to the entry point having the largest deficit without creating a new deficit in any of the other entry points. If the deficit can be eliminated, the largest deficit of all the entry points is eliminated by reallocating items between entry points and control returns to the block 190 to again determine the entry point with the largest deficit and the magnitude of the deficit. If the block 201 determines that the largest deficit cannot be eliminated, a block 202 converts the largest deficit to a surplus by assigning one less truck to the entry point containing the largest deficit and control returns to the blocks 174–186, FIG. 6E, where the surplus is eliminated.

Thus, for example, if 58,000 pounds is tentatively assigned to an entry point (resulting in a deficit of 2,000 pounds for two trucks) and the other entry points cannot together eliminate the deficit without creating another deficit, then the entry point is assigned a single truck (carrying 40,000 pounds) and is considered to have a surplus of 18,000 pounds. This surplus is eliminated by reallocating items to other entry points by the blocks 174–186. As should be evident from the foregoing, if a particular entry point is assigned a single truck but has a deficit that cannot be eliminated, the weight of the items tentatively assigned to the particular entry point is considered a surplus and the items are reassigned to other entry points. In this case, no items will be sent to the particular entry point since no trucks will be sent there.

Once a surplus obtained by conversion of a deficit has been eliminated, the deficits are then calculated once again and control remains with the blocks 190–203 (and perhaps with the blocks 174–186 in the event calculated deficits cannot be eliminated) until all of the deficits have been eliminated or converted to surpluses.

Once all of the deficits for the entry points have been eliminated or converted to surpluses and eliminated, control passes from the block 200 to a block 204 which displays the proposed distribution plan and the cost to implement the plan, together with the cost which would be incurred by mailing the items from the entry point associated with the origin.

It should be noted that the block 204 is executed immediately following the block 172 if it is determined by the block 172 that the truck balancing criteria have been met with no surpluses or deficits.

The programming illustrated in FIGS. 7A–7E may be executed by the block 164 of FIG. 6D. The programming permits an operator to ascertain whether items may be entered into the Postal System at stopoff locations at or near the route of a truck delivering items. Stopoff locations may be located between the origin and a primary entry point to which the truck is going, or may in fact be located beyond the primary entry point. In this regard, it should be noted that the term "entry" denotes those places where items are to be entered into the Postal System, regardless of whether such location is considered a "stopoff" or a "primary entry".

Figure 7A:
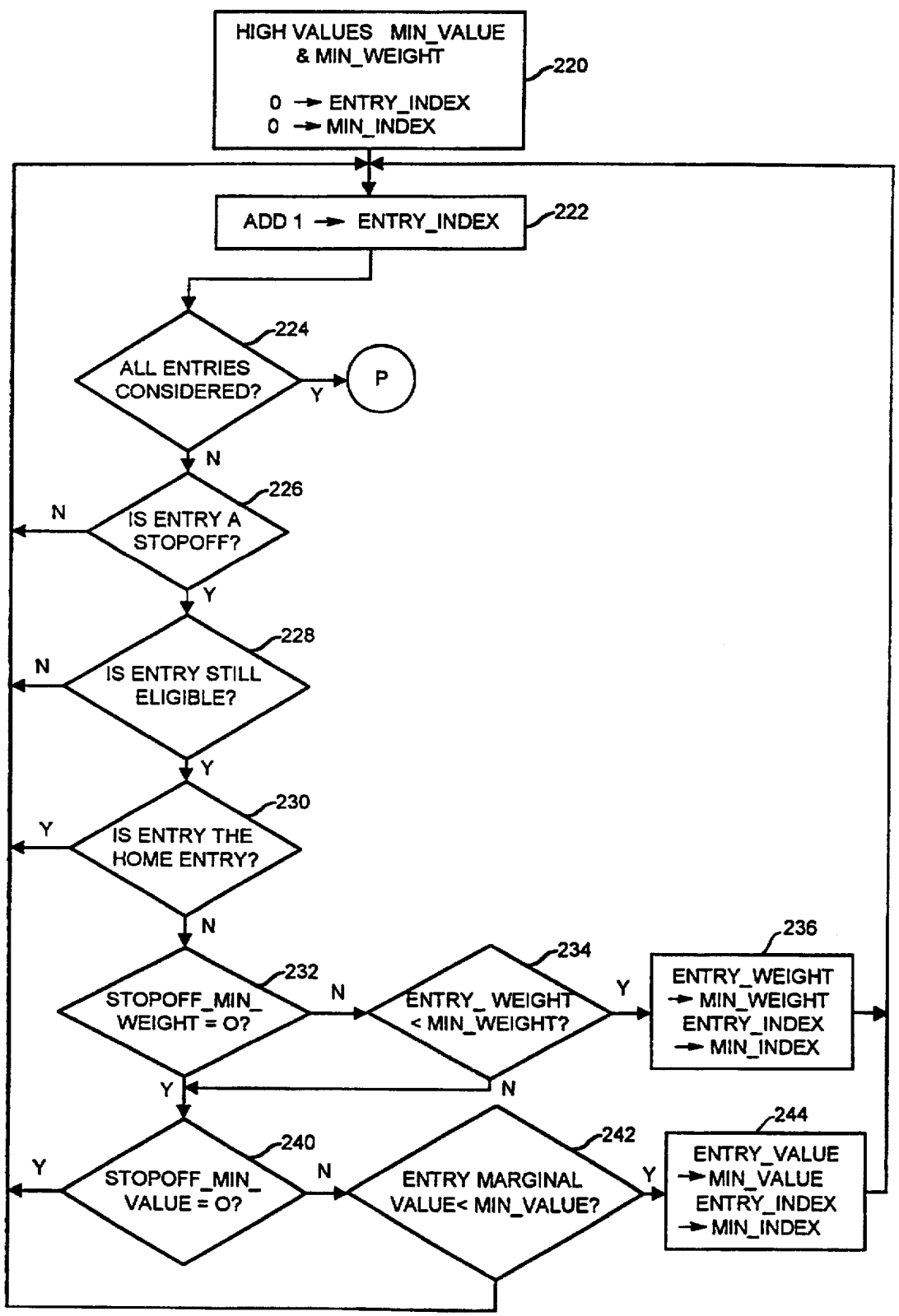
FIGS. 7A–7E, when joined along the similarly lettered lines, together comprise a flowchart of programming which may be executed by the block 164 of FIG. 6D.

The programming begins at a block 220, FIG. 7A, which assigns arbitrarily high values to variables MIN_VALUE and MIN_WEIGHT. In addition, a zero value is assigned to variables ENTRY_INDEX and MIN_INDEX. Also, it should be noted that, previous to this point in the programming at the block 110, FIG. 6A, the operator specifies a nonzero value for one of two variables called STOPOFF_MIN_WEIGHT and STOPOFF_MIN_VALUE representing the minimum weight or values, respectively, which may be sent to a stopoff point. The other variable (i.e., the one which was not assigned a nonzero value) is assigned a value of zero. Also, the operator specifies at the block 110 all of the primary entry points to be considered and, for each primary entry point, all potential stopoffs to be considered therewith. Thus, for example, an operator may specify primary entry points A, B and C and stopoff locations D and E for primary entry point A, stopoff locations F and G for primary entry point B and stopoff locations H and I for primary entry point C.

Following the block 220, a block 222 increments the variable ENTRY_INDEX and control passes to a block 224 which checks to determine whether all entries have been tested to determine whether they have been specified by the operator as stopoff candidates. If not, a block 226 checks to determine whether the entry currently under consideration is the entry currently under consideration, as indicated by the value of the variable ENTRY_INDEX, is specified as a stopoff candidate. If this is not the case, control bypasses the remaining blocks of FIG. 7A and returns to the block 222 where the variable ENTRY_INDEX is again incremented so that the next entry is evaluated as a possible stopoff.

If the block 226 determines that the entry currently under consideration is a specified stopoff candidate, a block 228 checks to determine whether such entry is eligible. If the entry is not eligible, control returns to the block 222 where the next entry is evaluated. On the other hand, if the entry is still eligible, a block 230 checks to determine whether the entry currently under consideration is the entry associated with the origin (hereinafter the "home entry"). If so, control returns to the block 222 where the next entry is evaluated since the home entry is never considered as a candidate for stopoffs.

If the entry currently under consideration is not the home entry, a block 232 begins a series of tests to determine whether the entry currently under consideration meets a stopoff criterion. The block 232 checks to determine whether the value of the variable STOPOFF_MIN_WEIGHT is equal to zero. If not, then the user has specified a criterion whereby a stopoff must have a minimum weight delivered to it and hence control passes to a block 234 which checks to determine whether the weight of items to be delivered to the entry currently under consideration is less than the variable MIN_WEIGHT. If this is found to be the case, a block 236 assigns a value representing the weight to go to the entry currently under consideration to the variable MIN_WEIGHT and assigns the value of the variable ENTRY_INDEX to the variable MIN_INDEX. Control from the block 236 then returns to the block 222 for evaluation of the next entry.

If the block 232 determines that the variable STOPOFF_MIN_WEIGHT is equal to zero, then it has been determined that the operator has specified a nonzero value for the variable STOPOFF_MIN_VALUE. Control then passes to a block 240. Control also passes to the block 240 from the block 234 if it is determined that the weight to go to the entry currently under consideration is not less than the value of the variable MIN_WEIGHT. The block 240 determines whether the value of the variable STOPOFF_MIN_VALUE is equal to zero. If so, then it has been determined that the stopoff criterion has been assigned by the operator in terms of weight, and hence control returns to the block 222 for evaluation of the next entry. If the block 240 determines that the value of the variable STOPOFF_MIN_VALUE is not equal to zero, control passes to a block 242 which checks to determine whether the marginal value of the entry currently under consideration is less than the current value of the variable MIN_VALUE. The "marginal value" of the entry is defined as the sum of the values of MARGINAL_VALUE for the zip code areas associated with the entry. If the block 242 determines that the marginal value of the current entry is not less than the value of the variable MIN_VALUE, control returns to the block 222. Otherwise, a number representing the marginal value of such entry is assigned to the variable MIN_VALUE and the value of the variable ENTRY_INDEX is assigned to the value of the variable MIN_INDEX by a block 244. Thereafter, control returns to the block 222 for evaluation of the next entry.

Figure 7B:
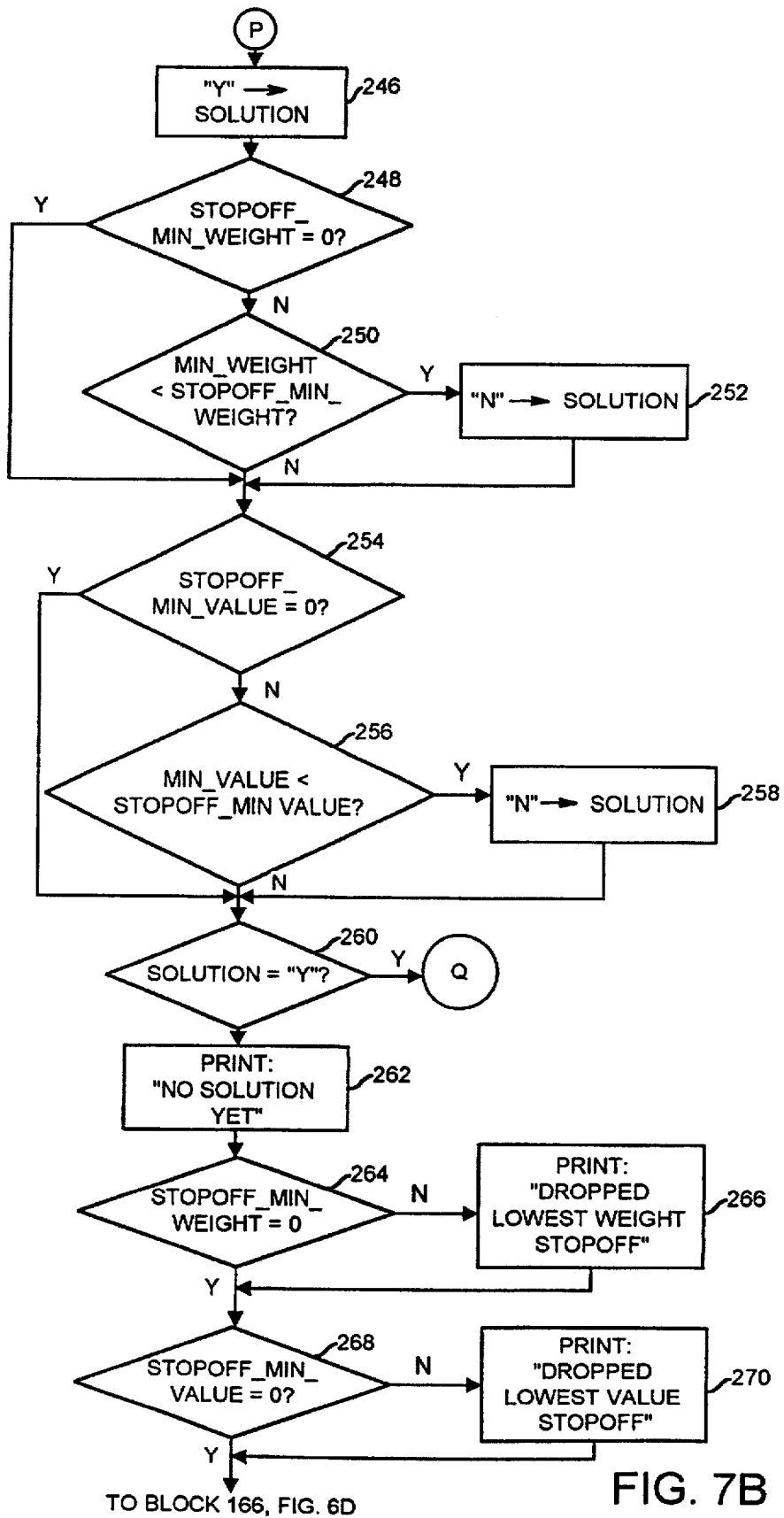
Figure 7C:
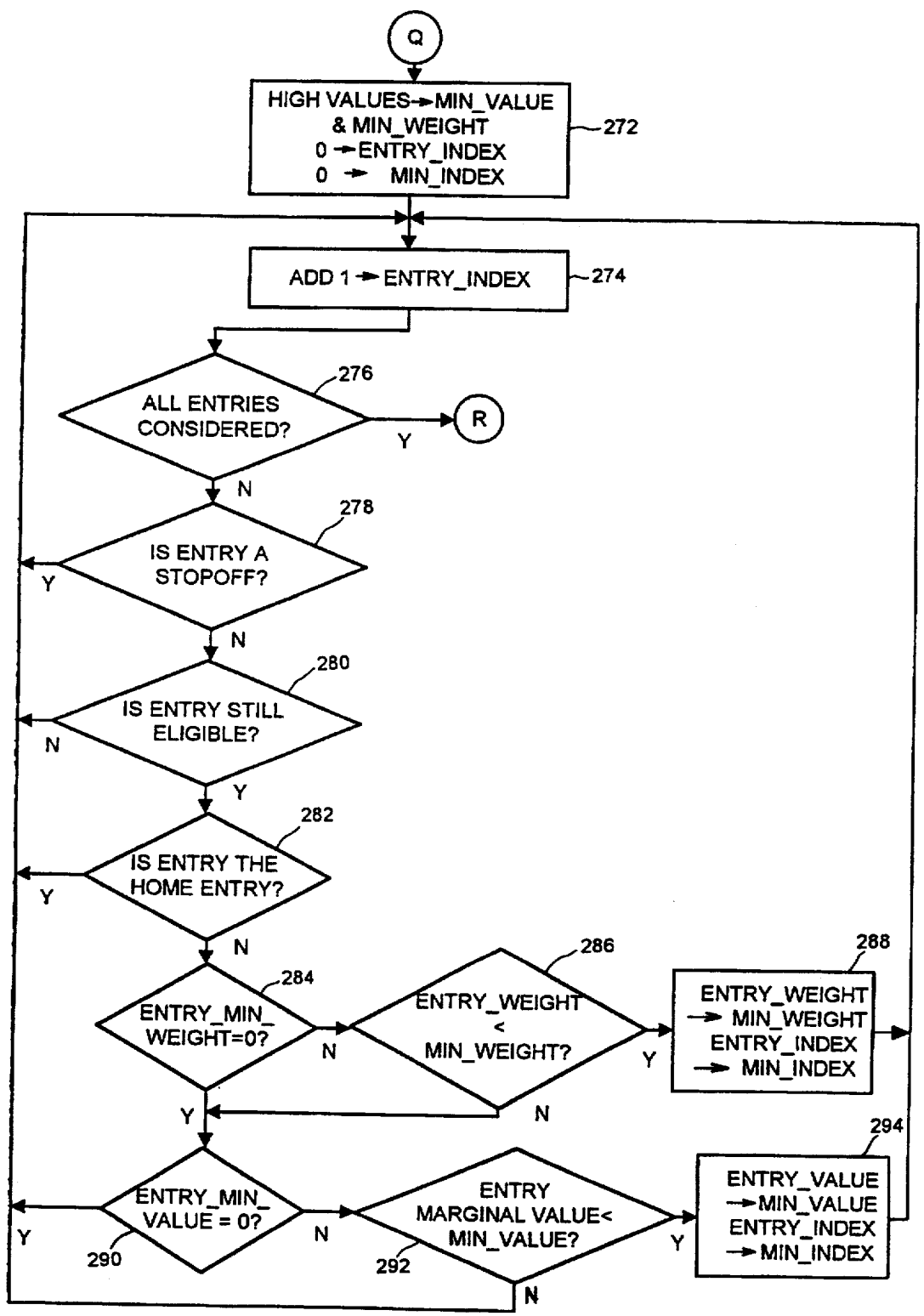

Once all of the stopoff candidates have been considered, as determined by the block 224, control passes to a block 246, FIG. 7B, which assigns a number representing a "yes" to a variable SOLUTION. This variable, as noted in greater detail hereinafter, indicates to the operator that a potential solution, i.e., a plan which meets the specified criteria, has been found. Following the block 246, a block 248 checks to determine whether the value of the variable STOPOFF_MIN_WEIGHT is equal to zero. If not, then it has been determined that the user has specified a minimum weight for stopoffs, and hence control passes to a block 250 which checks to determine whether the value of the variable MIN_WEIGHT is less than the value of the variable STOPOFF_MIN_WEIGHT. If so, then it has been determined that an insufficient weight would be delivered to one or more stopoffs, and hence a block 252 assigns a number representing a "no" to the variable SOLUTION.

On the other hand, if the block 250 determines that the value of the variable MIN_WEIGHT is greater than or equal to the variable STOPOFF_MIN_WEIGHT, then a block 254 checks to determine whether the user has specified a minimum value for stopoffs. If so, then the value of the variable STOPOFF_MIN_WEIGHT is not equal to zero and hence a block 256 checks to determine whether the value of the variable MIN_VALUE is less than the value of the variable STOPOFF_MIN_VALUE. If this is found by the block 256 to be the case, then the solution criterion has not been met, and hence a block 258 assigns a value of "no" to the variable SOLUTION. Following the block 258, or if the block 254 determines that the variable STOPOFF_MIN_VALUE is equal to zero or if the block 256 determines that the variable MIN_VALUE is greater than or equal to the variable STOPOFF_MIN_VALUE, a block 260 checks to determine whether a value of "yes" has been assigned to the variable SOLUTION. If so, control passes to the programming illustrated in FIG. 7C. On the other hand, if the variable SOLUTION has not been assigned a "yes" value, a block 262 issues a command to a printer or other display device to print a message indicating that no solution has been found as yet. Following the block 262, a set of blocks 264–270 indicate to a user that a stopoff has been dropped from consideration. More particularly, if a block 264 determines that the variable STOPOFF_MIN_WEIGHT is not equal to zero, the block 266 prints a message indicating that the lowest weight stopoff has been dropped from consideration. If the block 268 determines that the variable STOPOFF_MIN_VALUE is not equal to zero, a block 270 prints an indication that the lowest value stopoff has been dropped from consideration.

Following the blocks 268 and 270, control returns to the block 166, FIG. 6D, where the determination is made whether the solution criteria have been met and the block 168 where the stopoff having the lowest weight or marginal value is rendered ineligible if the solution criteria have not been met.

As noted previously, when the block 260 determines that the variable SOLUTION has been assigned a "yes" value, control passes to a set of blocks 272–294 analogous to the blocks 220–244 of FIG. 7A, except that primary entries (i.e., entries that are not stopoffs) are evaluated at this time. More particularly, as part of the block 110, FIG. 6A, the operator specifies either a minimum weight or a minimum value through the use of variables ENTRY_MIN_WEIGHT and ENTRY_MIN_VALUE, respectively, which must be exceeded in order for an entry to be found as a possible solution. Only one of the variables is assigned a nonzero value while the other is assigned a zero value. The block 272 assigns arbitrarily high values to the variables MIN_VALUE and MIN_WEIGHT and a zero value to the variables ENTRY_INDEX and MIN_INDEX. The block 274 then increments the variable ENTRY_INDEX and a block 276 checks to determine whether all primary entries have been considered. If not, the block 278 checks to determine whether the entry currently under consideration is a specified stopoff candidate. Unlike the block 224 of FIG. 7A, the block 278 returns control to the block 274 if the entry currently under consideration is a stopoff candidate. On the other hand, if the entry is not considered a stopoff candidate, the blocks 280–294 establish values for the variables MIN_WEIGHT, MIN_VALUE and MIN_INDEX as noted in connection with FIG. 7A for all primary entries.

Figure 7D:
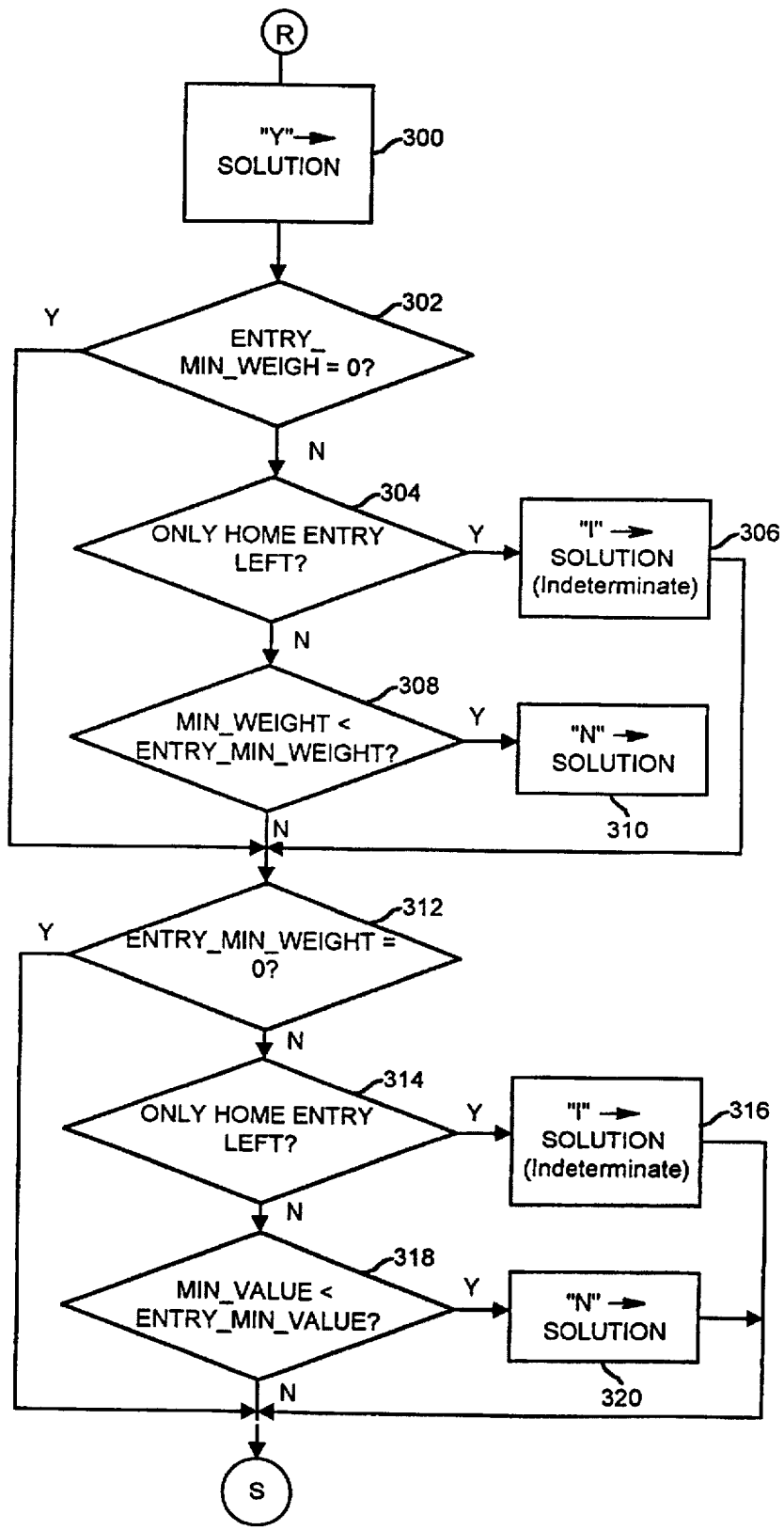

Once all primary entries have been considered, as determined by the block 276, control passes to a block 300, FIG. 7D.

The block 300 assigns a value of "yes" to the variable SOLUTION. Following the block 300, a block 302 checks to determine whether the user has specified a minimum weight for entries. If so, i.e., the user has specified a weight other than zero, control passes to a block 304 which checks to determine whether the home entry is the only remaining entry considered to be a viable entry. If this is also the case, a determination has been made that no distribution plan can be devised meeting specified criteria using entry points other than the home entry point. Such a conclusion is considered as an indeterminate solution and a value corresponding thereto is assigned to the variable SOLUTION by a block 306.

If the block 304 determines that at least one entry other than the entry associated with the origin is considered to be viable, then a block 308 checks to determine whether the value of the variable MIN_WEIGHT is less than the value of the variable ENTRY_MIN_WEIGHT. If so, then at least one entry has been found having a total weight assigned thereto which is less than the specified minimum weight. A block 310 thus assigns a value of "no" to the variable SOLUTION.

Control from the blocks 306 and 310, and from the block 308 if the value of the variable MIN_WEIGHT is found to be greater than or equal to the variable ENTRY_MIN_WEIGHT, passes to a block 312. Control also passes from the block 302 to the block 312 if the variable ENTRY_MIN_WEIGHT is equal to zero. The block 312 checks to determine whether the user has specified a nonzero value for the variable ENTRY_MIN_VALUE. If so, a block 314, like the block 304, checks to determine whether the only viable entry is the home entry. Again, if this is found to be the case, a value is assigned to the variable SOLUTION by a block 316 indicating that an indeterminate solution has been found. Otherwise, a block 318 checks to determine whether the variable MIN_VALUE is less than the variable ENTRY_MIN_VALUE. If this is found to be the case, then at least one entry fails to meet the specified solution criteria, and hence a value is assigned the variable SOLUTION indicating that no solution has been found.

Figure 7E:
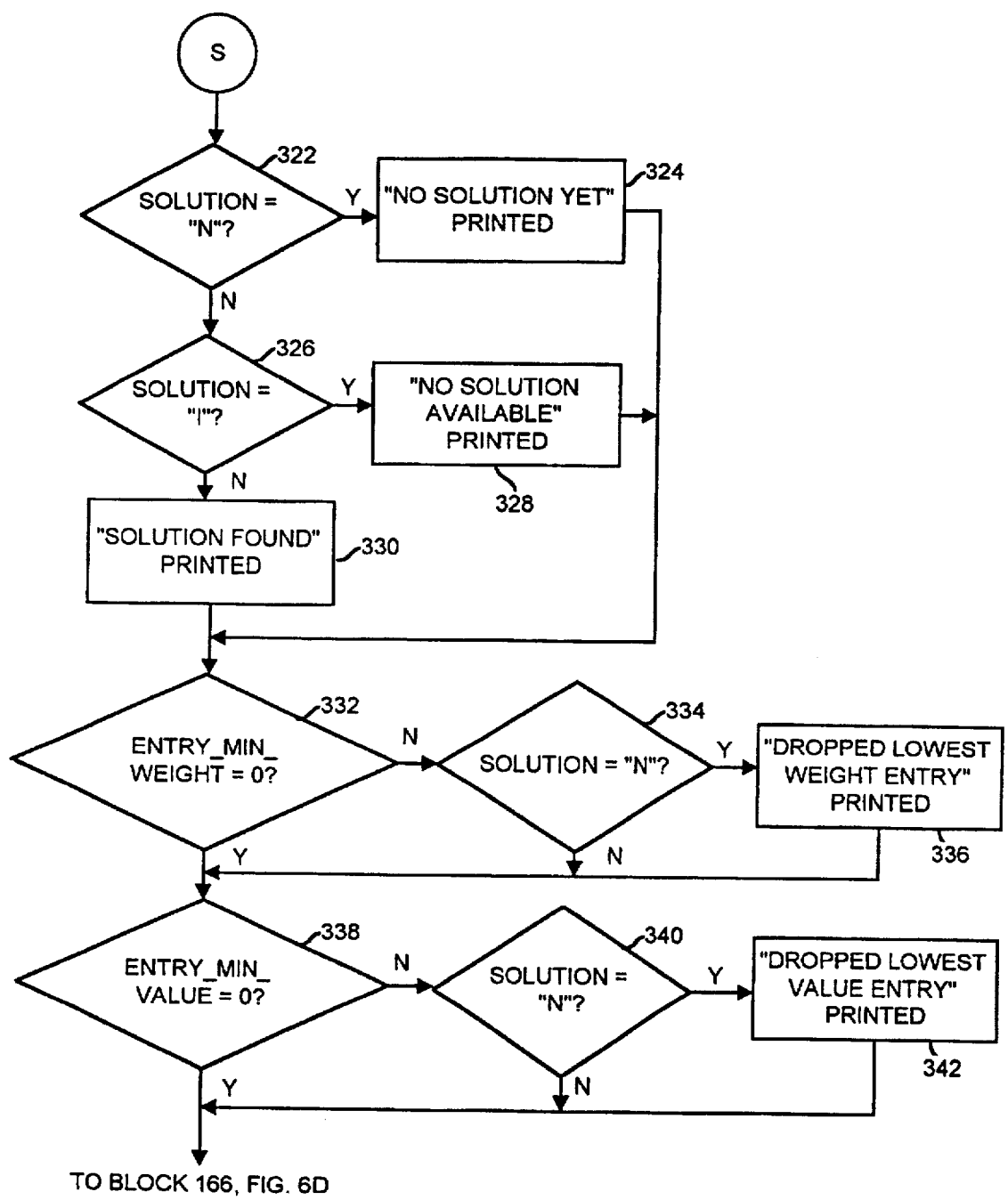

Control from the blocks 316 and 320 passes to a message routine illustrated in FIG. 7E. Control also passes to the message routine if the block 312 finds that the user has not specified a value for the variable ENTRY_MIN_VALUE other than zero or if the block 318 determines that the variable MIN_VALUE is greater than or equal to ENTRY_MIN_VALUE. The message routine begins at a block 322 which determines whether the value assigned to the variable SOLUTION indicates that no solution has been found. If so, a block 324 causes the printer or another display device to indicate that no solution has yet been found. If the block 322 determines that the value assigned to the variable SOLUTION is other than "no", a block 326 checks to determine whether the value of such variable indicates that an indeterminate solution has been found. If this is found to be the case, a block 328 causes the printer or other display device to indicate that fact. Otherwise, a block 330 causes the printer or display device to develop an indication that a solution has been found.

Control from the blocks 324, 328 and 330 passes to a block 332 which determines whether the variable ENTRY_MIN_WEIGHT is equal to zero. If not, and if a block 334 determines that no solution has yet been found, a block 336 causes the printer or display device to develop an indication that the entry having the lowest weight to be delivered thereto has been dropped from further consideration.

If the block 332 determines that a value of zero has been assigned to the variable ENTRY_MIN_WEIGHT or if the block 334 determines that the value of the variable SOLUTION is other than "no", a block 338 checks to determine whether the variable ENTRY_MIN_VALUE is equal to zero. If not, and if a block 340 determines that no solution has been found, a block 342 causes the printer or display device to develop an indication that the entry having the lowest value of items to be sent thereto has been dropped from further consideration. Control passes from the block 342 to the block 166 of FIG. 6D. Control also passes to the block 166 if the block 338 determines that the variable ENTRY_MIN_VALUE is equal to zero or if the block 340 determines that a solution other than a no solution has been found.

The programming illustrated in FIGS. 7A–7E evaluates stopoffs before entries are evaluated. Specifically, once the stopoffs have been determined as eligible based on an initial iterative process using minimum criteria for a stopoff, the stopoffs are considered together with their associated primary entry points in a second iterative process to determine whether an overall solution can be found. If a primary entry point is rendered ineligible due to failure to meet the entry criteria, the stopoffs associated therewith are also rendered ineligible and the items that were tentatively assigned to the primary entry point and its associated stopoffs are reassigned to one or more other entry points. The programming of FIGS. 6A–6F and 7A–7E is then reexecuted. If a solution is found or if an indeterminate solution is found (i.e., items are only to be entered into the Postal System at the home entry and the items fail to meet the solution criteria for a primary entry point other than the home entry) the block 166 determines that the solution criteria have been met and control passes to the block 170 of FIG. 6D. If the value of the variable SOLUTION indicates that no solution has been found, control passes to the block 168 which renders the entry having the lowest weight or marginal value ineligible, as described previously. Further iterations of the programming illustrated in FIGS. 6A–6F occur until an acceptable solution has been found or until a determination is made that all items are to be entered at the home entry.

It should be noted that, when items are reassigned from a stopoff, such items are allocated to a remaining eligible primary entry or stopoff providing the next best economic benefit. Similarly, when items are reassigned from a primary entry point, such items are allocated to a remaining eligible primary entry or stopoff providing the next best economic benefit.

The programming illustrated in the Figures can derive a distribution plan where items are to be delivered to stopoffs but not to the primary entry associated with such stopoffs. In this case, the truck(s) delivering such items would simply bypass the primary entry point and proceed directly to the stopoffs.

The method of the present invention is not limited to use with the algorithm implemented by the programming of FIGS. 6A–6F. In fact, other computational and/or programming techniques could be used in lieu thereof, such as a linear programming technique or the like.

Also, the usefulness of the method of the present invention is not limited to situations where items are to be distributed via hired carrier and the U.S. Postal Service. In fact, the present method can be utilized to derive distribution plans for any combination of two or more distribution systems including private trucking companies, air freight companies, waterway shipping companies, United Parcel Service, the U.S. Postal Service and the like.

We claim:

1. A system for developing a plan for concurrent distribution of items from an origin to a plurality of destinations using at least one of first and second distribution systems, wherein the first distribution system includes a geographically zoned rate structure and provides for delivery of any number of items to substantially every residential and commercial location in the United States, the system comprising:

data entry means for permitting an operator to enter data;

a memory for storing a plurality of entry points entered by an operator via the data entry means, each entry point comprising a possible location for entry of items into the first distribution system including an origin entry point for the origin and at least one remote entry point for a location remote from the origin; and a processing unit including first cost estimate deriving means responsive to an indication of an estimated total number of items to be distributed for deriving a first total cost estimate representing the total cost of distributing the estimated number of items from the origin entry point to the destinations using the first distribution system, first data developing means for developing data for each remote entry point representing a first estimated cost to send items using the second distribution system from the origin entry point to a remote entry point, second data developing means for developing data for each remote entry point representing a second estimated cost to send items using the first distribution system from the remote entry point to each destination, second cost estimate deriving means responsive to the data for deriving a second total cost estimate representing the total cost of distributing the estimated number of items from the origin entry point to the destinations via at least one of the remote entry points using a combination of the first and second distribution systems, plan deriving means responsive to an indication of an actual number of items to be distributed and iteratively operable for deriving distribution plans for distribution of items to destinations via different remote entry points using the first and second distribution systems;

plan selecting means for selecting one of the distribution plans if the second total cost estimate is less than the first total cost estimate; and means for generating a report of the distribution plan.

2. The system of claim 1, wherein the processing unit further includes means for comparing the first total cost estimate to the second total cost estimate.

3. The system of claim 1, wherein the memory includes means for storing a stopoff location entered by an operator, the stopoff location comprising a possible location for entry of items into the first distribution system wherein the stopoff location is located near a route between the origin entry point and the at least one remote entry point.

4. The system of claim 1, wherein the first distribution system comprises the U.S. Postal System, which provides for distribution of the items as one of second-class, third-class, and fourth-class U.S. mail, and wherein the memory further includes means for storing an indication entered by an operator of a mail class for the items and wherein the first and second cost estimate deriving means are further responsive to the indication of the mail class.

5. The system of claim 4, wherein the memory further stores a table of pseudo zones for third class mail and wherein the first and second cost estimate deriving means are further responsive to the table of pseudo zones.

6. The system of claim 1, wherein the memory further includes means for storing an indication entered by an operator of the weight of the items to be distributed and wherein the first and second cost estimate deriving means and the plan deriving means derive the respective first and second total cost estimates and the distribution plan, respectively, based on the indication of the weight.

7. A system for developing a plan for concurrent distribution of items from an origin to a plurality of destinations using at least one of first and second distribution systems, wherein the first distribution system includes a geographically zoned rate structure and provides for delivery of any number of items to substantially every residential and commercial location in the United States, the system comprising:

data entry means for permitting an operator to enter data;

a memory for storing a plurality of entry points entered by an operator via the data entry means, each entry point comprising a possible location for entry of items into the first distribution system including an origin entry point for the origin and at least one remote entry point for a location remote from the origin;

a processing unit including first cost estimate deriving means responsive to an indication of an estimated total number of items to be distributed for deriving a first total cost estimate representing the total cost of distributing the estimated number of items from the origin entry point to the destinations using the first distribution system, first data developing means for developing data for each remote entry point representing a first estimated cost to send items using the second distribution system from the origin entry point to a remote entry point, second data developing means for developing data for each remote entry point representing a second estimated cost to send items using the first distribution system from the remote entry point to each destination, second cost estimate deriving means responsive to the data for deriving a second total cost estimate representing the total cost of distributing the estimated number of items from the origin entry point to the destinations via at least one of the remote entry points using a combination of the first and second distribution systems, plan deriving means responsive to an indication of an actual number of items to be distributed and iteratively operable for deriving distribution plans for distribution of items to destinations via different remote entry points using the first and second distribution systems; and plan-selecting means for selecting one of the distribution plans if the second total cost estimate is less than the first total cost estimate; and means responsive to the plan-selecting means for distributing the items.

8. The system of claim 7, wherein the processing unit further includes means for comparing the first total cost estimate to the second total cost estimate.

9. The system of claim 7, wherein the memory includes means for storing a stopoff location entered by an operator, the stopoff location comprising a possible location for entry of items into the first distribution system wherein the stopoff location is located near a route between the origin entry point and the at least one remote entry point.

10. The system of claim 7, wherein the first distribution system comprises the U.S. Postal System, which provides for distribution of the items as one of second-class, third-class, and fourth-class U.S. mail, and wherein the memory further includes means for storing an indication entered by an operator of a mail class for the items and wherein the first and second cost estimate deriving means are further responsive to the indication of the mail class.

11. The system of claim 10, wherein the memory further stores a table of pseudo-zones for third-class mail and wherein the first and second cost estimate deriving means are further responsive to the table of pseudo-zones.

12. The system of claim 7, wherein the memory further includes means for storing an indication entered by an operator of the weight of the items to be distributed and wherein the first and second cost estimate deriving means and the plan deriving means derive the respective first and second total cost estimates and the distribution plan, respectively, based on the indication of the weight.

* * * * *